(12) United States Patent
 Kim et al.

(10) Patent No.: US 10,768,359 B2
(45) Date of Patent: Sep. 8, 2020

(54) DISPLAY APPARATUS

(71) Applicant: SAMSUNG ELECTRONICS CO., LTD., Suwon-si (KR)

(72) Inventors: Jong Bin Kim, Suwon-si (KR); Dae Young Kim, Hwaseong-si (KR); Hyung-Ki Kim, Anyang-si (KR); Kil Hong Lee, Suwon-si (KR); Duk Jin Jeon, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/720,485

(22) Filed: Sep. 29, 2017

(65) Prior Publication Data

US 2018/0164498 A1    Jun. 14, 2018

(30) Foreign Application Priority Data

Dec. 8, 2016 (KR) .......................... 10-2016-0166958

(51) Int. Cl.
    *F21V 8/00* (2006.01)
    *G02F 1/13357* (2006.01)
    (Continued)

(52) U.S. Cl.
    CPC ......... *G02B 6/0088* (2013.01); *G02B 6/0068* (2013.01); *G02B 6/0091* (2013.01);
    (Continued)

(58) Field of Classification Search
    CPC .. G02B 6/0088; G02B 6/0068; G02B 6/0091; G02B 6/009; G02B 6/0086;
    (Continued)

(56) References Cited

U.S. PATENT DOCUMENTS

| 2011/0044071 A1 | 2/2011 | Cho et al. |
| 2011/0304795 A1 | 12/2011 | Lee et al. |
| 2012/0081925 A1 | 4/2012 | Cho et al. |
| 2013/0077343 A1 | 3/2013 | Kim et al. |
| 2014/0043855 A1* | 2/2014 | Kang ............... G02B 6/009 |
| | | 362/612 |
| 2014/0104538 A1 | 4/2014 | Park et al. |
| 2014/0118630 A1 | 5/2014 | Sasaoka et al. |

(Continued)

FOREIGN PATENT DOCUMENTS

| CN | 204903917 U | 12/2015 |
| KR | 10-2011-0041967 A | 4/2011 |

OTHER PUBLICATIONS

Communication dated Apr. 12, 2018 issued by the European Patent Office in counterpart European Patent Application No. 17196207.9.
(Continued)

*Primary Examiner* — Sonji N Johnson
(74) *Attorney, Agent, or Firm* — Sughrue Mion, PLLC

(57) ABSTRACT

A display apparatus including a display panel configured to display an image, a light source module including a plurality of light sources, a light guide plate configured to guide light generated by the light source module to the display panel, and a coupling member including a first surface configured to support the light guide plate, a second surface configured to support the light source module, the second surface being disposed opposite the first surface, and a support provided between the first surface and the second surface and configured to support the light guide plate spaced apart from the light source module.

22 Claims, 19 Drawing Sheets

(51) Int. Cl.
*G02F 1/1333* (2006.01)
*G02F 1/1335* (2006.01)

(52) U.S. Cl.
CPC .. *G02F 1/133308* (2013.01); *G02F 1/133608* (2013.01); *G02F 1/133504* (2013.01); *G02F 2001/13332* (2013.01); *G02F 2001/133314* (2013.01); *G02F 2001/133317* (2013.01); *G02F 2201/46* (2013.01); *G02F 2201/465* (2013.01)

(58) Field of Classification Search
CPC ......... G02F 1/133308; G02F 1/133608; G02F 2001/133314; G02F 2201/46; G02F 2001/13332; G02F 1/133504; G02F 2001/133317; G02F 2201/465
See application file for complete search history.

(56) References Cited

U.S. PATENT DOCUMENTS

| 2015/0247967 | A1 | 9/2015 | Horiuchi et al. |
| 2016/0223867 | A1 | 8/2016 | Kim et al. |
| 2016/0313606 | A1 | 10/2016 | Kim et al. |
| 2017/0205573 | A1 | 7/2017 | Ma et al. |

OTHER PUBLICATIONS

Communication dated Oct. 28, 2019, issued by the European Patent Office in counterpart European Application No. 17 196 207.9.
Office Action dated Apr. 23, 2020 by the State Intellectual Property Office of P.R. China in counterpart Chinese Patent Application No. 201711273980.2.

* cited by examiner

DISPLAY APPARATUS

CROSS-REFERENCE TO RELATED APPLICATION

This application claims the benefit of Korean Patent Application No. 10-2016-0166958, filed on Dec. 8, 2016 in the Korean Intellectual Property Office, the disclosure of which is incorporated herein by reference in its entirety.

BACKGROUND

1. Field

Methods and apparatuses consistent with exemplary embodiments relate to a display apparatus having an improved coupling structure.

2. Description of Related Art

A display apparatus is an apparatus which displays an image. An example of a display apparatus includes a monitor or a television. In the display apparatus, a self-emitting display panel, such as an organic light-emitting diode (OLED) display panel, and a light-receiving display panel, such as a liquid crystal display (LCD) panel, may be used.

SUMMARY

Exemplary embodiments relate to a display module and a display apparatus to which a light-receiving display panel is applied. The display apparatus to which the light-receiving display panel is applied includes a display panel which is a liquid crystal panel and which displays an image, and a backlight which supplies light to the display panel. The backlight includes a light source and a plurality of optical sheets which receive light from the light source and guide the light to the display panel.

The display panel, the backlight, and the like of the display apparatus are provided in a space formed between a bottom chassis and a top chassis located in front of the bottom chassis and coupled to the bottom chassis.

It is an aspect of the present disclosure to provide a display apparatus in which a light guide plate may be supported without a middle mold between a bottom chassis and a top chassis.

It is another aspect of the present disclosure to provide a display apparatus in which a light guide plate and a light source module may be supported while maintaining a distance between the light guide plate and the light source module.

According to an aspect of an exemplary embodiment, a display apparatus includes a display panel configured to display an image, a light source module including a plurality of light sources, a light guide plate configured to guide light generated by the light source module to the display panel, and a coupling member including a first surface configured to support the light guide plate, a second surface configured to support the light source module, the second surface being disposed opposite the first surface, and a support provided between the first surface and the second surface and configured to support the light guide plate spaced apart from the light source module.

A side surface of the light guide plate may be located at a first side of the support, and the light source module may be located at a second side of the support.

The coupling member may further include a cut portion located between the first surface and the second surface, and the support may be disposed in the cut portion.

The plurality of light sources may be located proximate to the cut portion and may be configured to emit light toward a side surface of the light guide plate through the cut portion.

The first surface may include a storage portion configured to support a side surface of the light guide plate, wherein the storage portion may include at least two walls configured to support at least a portion of the side surface of the light guide plate.

The second surface may include a coupling protrusion configured to pass through the light source module and couple to the light source module.

The display apparatus may further include a chassis disposed behind the light guide plate, and the coupling protrusion may be configured to pass through the chassis and couple to the chassis.

The light source module may include a first hole configured to accommodate the coupling protrusion, the chassis may include a second hole configured to accommodate the coupling protrusion, and the coupling protrusion may be configured to be inserted into the second hole after being inserted into the first hole.

The display apparatus may further include a chassis located behind the light guide plate, and the second surface may include a first coupling hook configured to pass through a first side of the chassis and couple to the chassis.

The second surface may include a second coupling hook configured to pass through a second side of the chassis and couple to the chassis.

The chassis may include a first hole configured to accommodate the first coupling hook, and a second hole configured to accommodate the second coupling hook.

The second surface may include a hook portion configured to couple to the light source module.

The coupling member may be located on a side surface of the light guide plate.

The coupling member may include a first coupling member and a second coupling member, the first coupling member being located on a first side surface of the light guide plate and the second coupling member being located on a second side surface of the light guide plate, the first side surface being disposed opposite the second side surface.

The display apparatus may further include a chassis located behind the light guide plate, and a support member located on a front surface of the chassis and configured to support a side surface of the display panel.

According to another aspect of an exemplary embodiment, a display apparatus includes a display panel configured to display an image, a top chassis located in front of the display panel, a light source module including a plurality of light sources, a light guide plate configured to guide light generated by the light source module to the display panel, a bottom chassis located behind the light guide plate and coupled to the top chassis, and a coupling member located between the top chassis and the bottom chassis, wherein the coupling member includes a first side configured to support the light guide plate, and a second side disposed opposite the first side, the second side being configured to support the light source module.

The first side and the second side of the coupling member may be spaced a distance apart from each other, and the light guide plate may be configured to be separated from the light source module by a gap having a length corresponding to the distance.

The coupling member may further include a storage portion extending from the first side of the coupling member, the storage portion being configured to support a side surface of the light guide plate, and a coupling protrusion extending from the second side of the coupling member, the coupling protrusion being configured to couple to the light source module such that the plurality of light sources face the side surface of the light guide plate.

The display apparatus may further include a support member provided at a corner of the display panel between the top chassis and the bottom chassis, the support member being configured to support a side surface of the display panel.

According to another aspect of an exemplary embodiment, a display apparatus includes a display panel configured to display an image, a light source module including a plurality of light sources, a light guide plate configured to guide light generated by the light source module to the display panel, the light guide plate having a tetragonal shape, a chassis configured to support a rear of the light guide plate, and a coupling member configured to support an edge of the light guide plate, wherein the coupling member includes an inner surface configured to support a side of the light guide plate, and an outer surface configured to support the light source module, the outer surface being coupled to the chassis, and wherein light emitted by the plurality of light sources toward the side of the light guide plate is guided through a cut portion provided between the inner surface and the outer surface.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
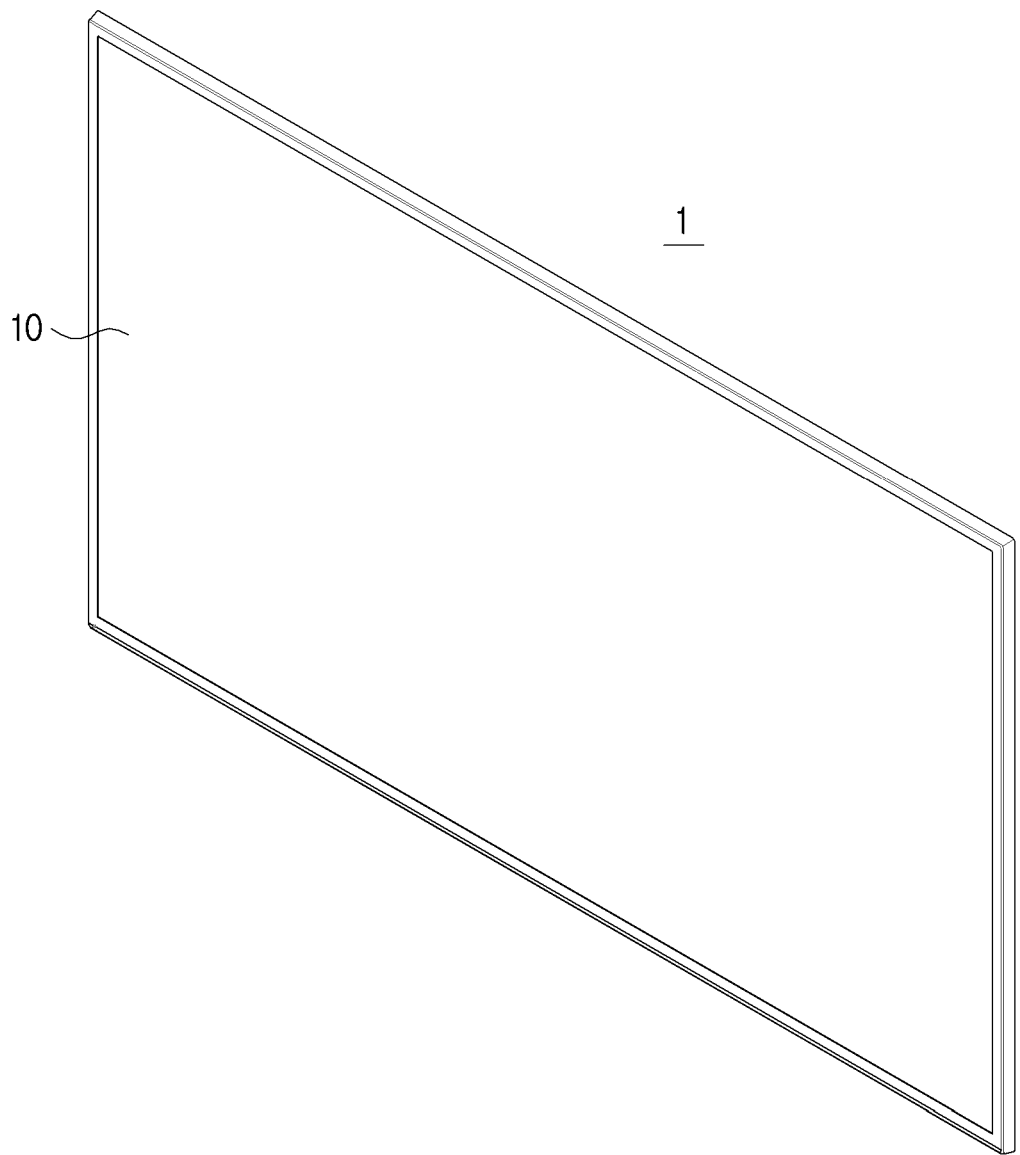
FIG. 1 is a perspective view of a display apparatus in accordance with an exemplary embodiment.

Exemplary embodiments set forth herein and structures illustrated in the appended drawings are merely examples. Various modified examples which may replace the exemplary embodiments and the drawings of the present disclosure would have been made at the filing date of the present application.

The same reference numbers or signs assigned in the drawings of the present disclosure represent components or elements having substantially the same functions.

The terminology used herein is for the purpose of describing particular exemplary embodiments only and is not intended to be limiting or defining of the present disclosure. As used herein, the singular forms "a," "an," and "the" are intended to include the plural forms as well, unless the context clearly indicates otherwise. It should be further understood that the terms "comprise" and/or "comprising," when used in this specification, specify the presence of stated features, integers, steps, operations, elements, components, and/or a combination thereof but do not preclude the presence or addition of one or more other features, integers, steps, operations, elements, components, and/or a combination thereof.

It should be understood that, although the terms "first," "second," etc., may be used herein to describe various components, the components are not limited by these terms. These terms are only used to distinguish one component from another component. For example, a first component discussed below could be termed a second component without departing from the scope of the present disclosure. Similarly, a second component discussed below could be termed a first component. The term "and/or" includes any and all combinations of one or more of the associated listed items.

Hereinafter, exemplary embodiments will be described in detail with reference to the accompanying drawings.

The present disclosure will be described with respect to a display apparatus 1, which is a flat display apparatus, as an example but is applicable to a curved display apparatus or a bendable or flexible display apparatus which may be switched between a curved state and a flat-panel state.

Furthermore, the present disclosure is applicable to the display apparatus 1 regardless of a screen size thereof. As an example, the present disclosure is applicable to either a product (such as a smart television or a monitor) which may be installed on a table or a wall or ceiling of a place, or a portable product (such as a tablet computer, a notebook computer, a smart phone, or an e-book).

As used herein, the terms "front" and "front surface" are based on a front surface of the display panel 10 on which an image is displayed with respect to the display apparatus 1 of FIG. 1. The terms "upper side" and "lower side" may be understood as meaning an upper side and a lower side of the display apparatus 1 of FIG. 1 and the terms "horizontal direction" and "lateral direction" may be understood as meaning a horizontal direction of the display apparatus 1 with respect to the front surface of the display panel 10.

Figure 2:
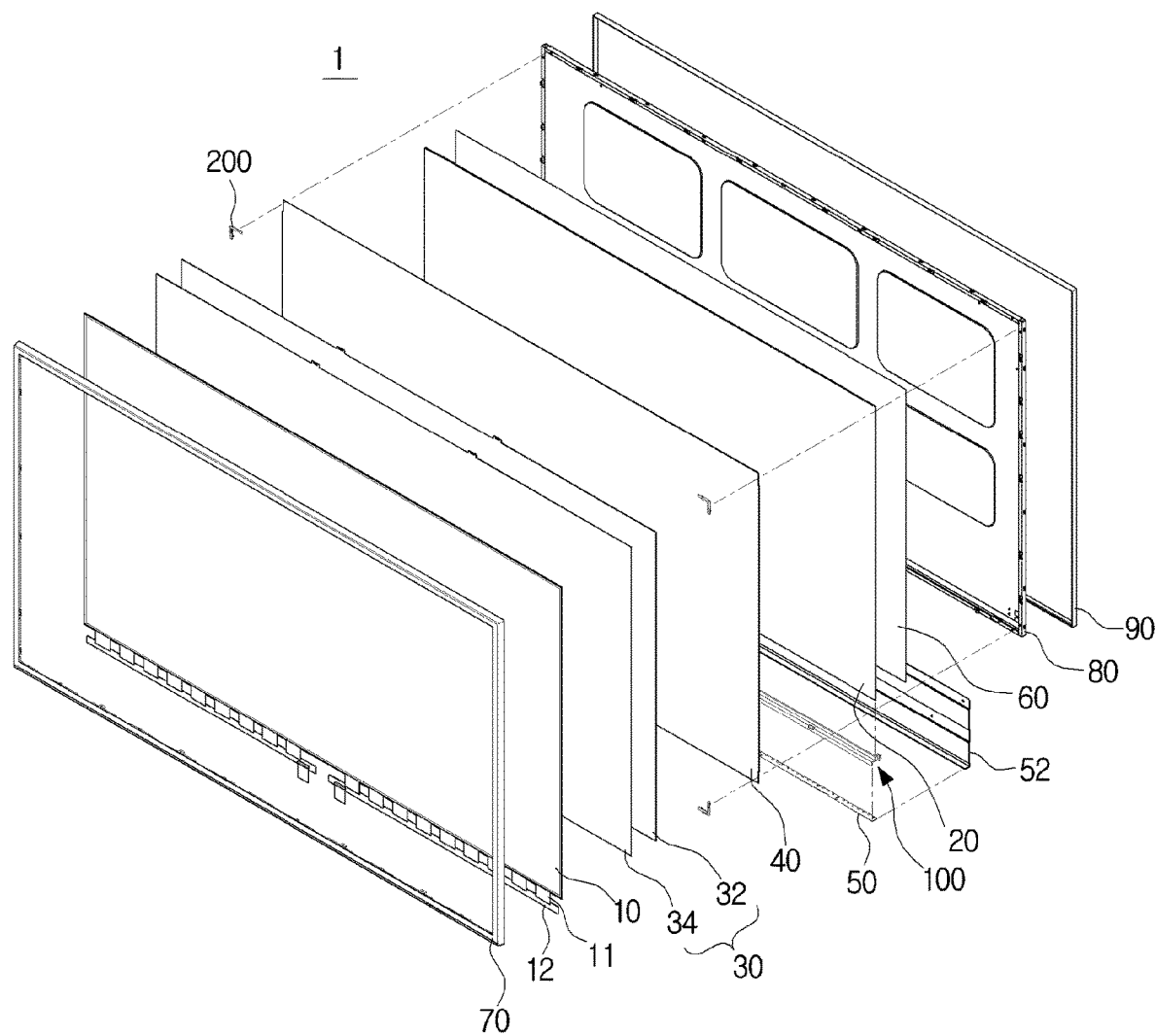
FIG. 2 is an exploded perspective view of a display apparatus in accordance with an exemplary embodiment of the present disclosure.

FIG. 1 is a perspective view of a display apparatus in accordance with an exemplary embodiment. FIG. 2 is an exploded perspective view of a display apparatus in accordance with an exemplary embodiment.

As illustrated in FIGS. 1 and 2, the display apparatus 1 may include the display panel 10 configured to display an image, a light guide plate 20 located behind the display panel 10 and configured to diffuse light from a light source and transmit the light to the display panel 10 in front of the light guide plate 20, and an optical sheet 30 provided between the display panel 10 and the light guide plate 20 to improve optical features of the light diffusing through the light guide plate 20.

Figure 3:
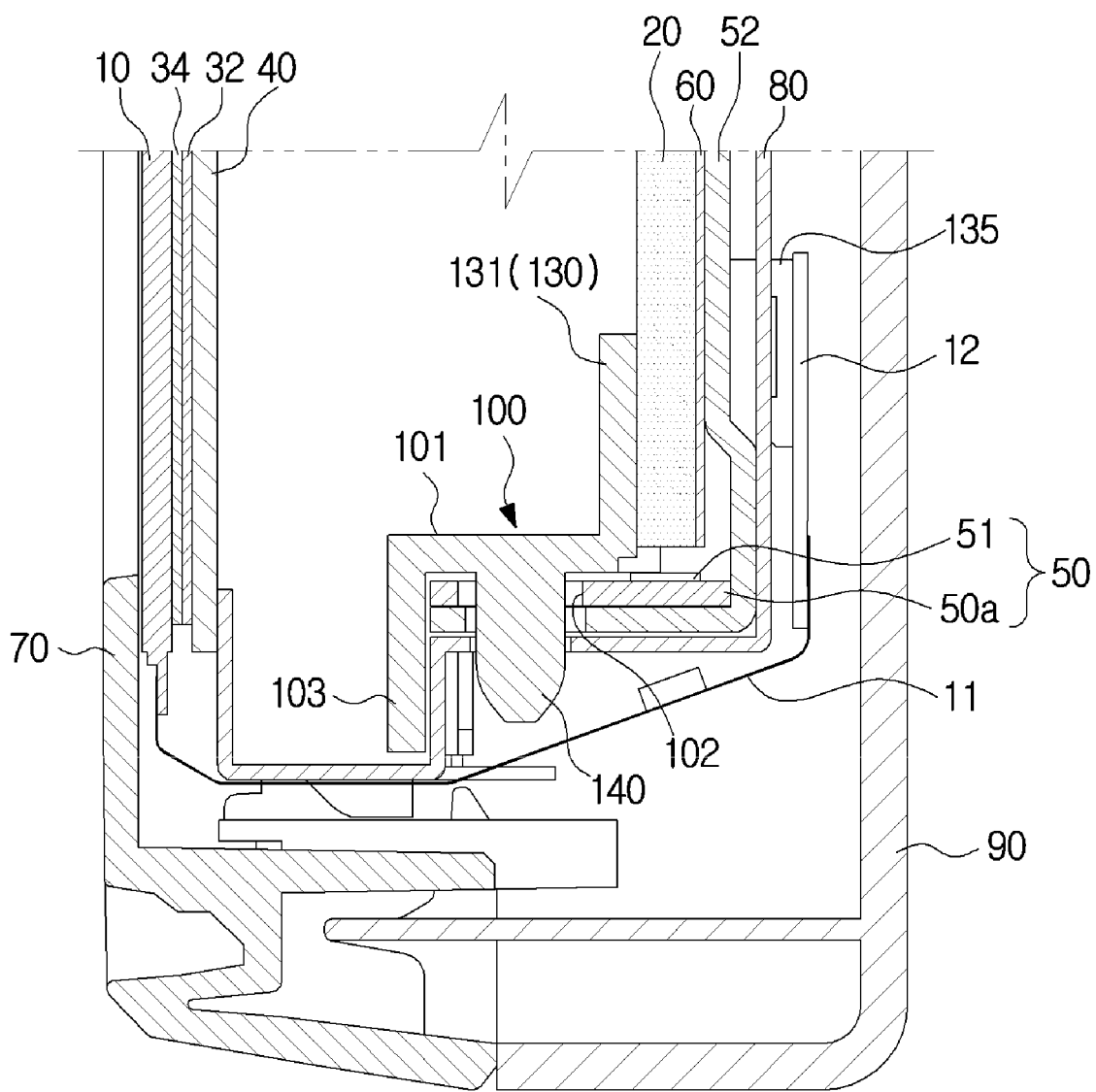
FIG. 3 is a side cross-sectional view of a lower side of a display apparatus in accordance with an exemplary embodiment.

The display apparatus 1 may include a light source module 50 having a plurality of light sources 51, which are illustrated in FIG. 3, generating light. The light source module 50 may be provided on at least one side surface among four side surfaces of the light guide plate 20 to emit light toward a side surface of the light guide plate 20 such that the light may be emitted toward the display apparatus 1.

The display apparatus 1 may further include a diffusion plate 40 provided between the light guide plate 20 and the display panel 10 to diffuse light from the light guide plate 20, and a reflecting plate 60 provided behind the light guide plate 20 to reflect the light from the light guide plate 20 to the front.

In accordance with an exemplary embodiment, the light source module 50 is provided on a lower surface of the light guide plate 20 and emits light upward, but exemplary embodiments are not limited thereto. Alternatively, a pair of light source modules 50 may be provided on an upper side of the light guide plate 20, provided on the upper side and a lower side of the light guide plate 20, provided on a left or right side surface of the light guide plate 20, or provided on the left and right side surfaces of the light guide plate 20.

The above-described components may be arranged in a space between a top chassis 70 on the front surface of the display panel 10 of the display apparatus 1 and a bottom chassis 80 behind the light guide plate 20.

The display apparatus 1 may further include a cover member 90 which extends from a rear part of the bottom chassis 80 to be coupled to the top chassis 70 and forms the exterior of the rear side of the display apparatus 1.

The display panel 10 may be a liquid crystal panel formed by filling liquid crystals between two substrates including electrodes and formed of glass. A printed circuit board (PCB) 12 which provides information to the display panel 10 may be located at a lower side of the display panel 10. Furthermore, a chip-on-film (CoF) 11 electrically connecting the PCB 12 and the display panel 10 may be located at the lower side of the display panel 10.

The CoF 11 extends from a lower side part of the display panel 10 and is coupled to the PCB 12. The CoF 11 may be bent at the lower side of the display panel 10 and extend to a rear side of the bottom chassis 80. Thus, the PCB 12 may be located behind the bottom chassis 80.

The optical sheet 30 may include a diffusion sheet 32 which re-diffuses light transmitted via the light guide plate 20, a prism sheet 34 which concentrates the diffused light in a direction perpendicular to the display panel 10, a protective sheet (not shown) protecting the prism sheet 34, and the like.

The plurality of light sources 51 of the light source module 50 may include light-emitting diodes (LEDs) which are point light sources formed in thin films applicable to a thin screen mounted on a bar type PCB. The light source module 50 may include a heat dissipation plate 52 which radiates heat generated by the plurality of light sources 51.

In a related art, the above-described components are supported by a top chassis, a bottom chassis, and a middle mold provided between the top chassis and the bottom chassis. In detail, the display panel and the optical sheet may be supported by a front surface of the middle mold, the light guide plate may be supported by a rear surface of the middle mold, and the top chassis and the bottom chassis may be pressurized toward the middle mold from the front and back of the middle mold. Thus, the components supported by the middle mold may be supported by the front and rear surfaces of the middle mold.

However, the middle mold in accordance with related art is formed to surround four edges of a display apparatus and support the components as described above in forward and backward directions. Thus, the middle mold has a predetermined thickness, and thus manufacturing costs and a thickness of the display apparatus increase.

Furthermore, the light guide plate and the light source module may be supported in a state in which a distance between a side surface of the light guide plate and the light source module is maintained constant. However, the middle mold supports both the light guide plate and the light source module inside edges thereof. Thus, a distance between the light guide plate and the light source module may not be constantly maintained when an external pressure is applied to the display apparatus.

That is, both the light source module and the light guide plate are provided inside four edges of the middle mold while an additional member supporting the light source module and the light guide plate is not provided. Thus, the distance between the side surface of the light guide plate and the light source module may not be maintained constant.

In accordance with an exemplary embodiment, the display apparatus 1 does not include a middle mold, and thus manufacturing costs and a thickness of the display apparatus 1 may decrease. A coupling member 100 located at a side of the display apparatus 1 may be used to support the light guide plate 20 instead of the middle mold and may support a side surface of the light guide plate 20 and the light source module 50 such that a distance therebetween is maintained constant to improve reliability of the display apparatus 1.

The coupling member 100 of the display apparatus 1 in accordance with an exemplary embodiment will be described in detail below.

Figure 4:
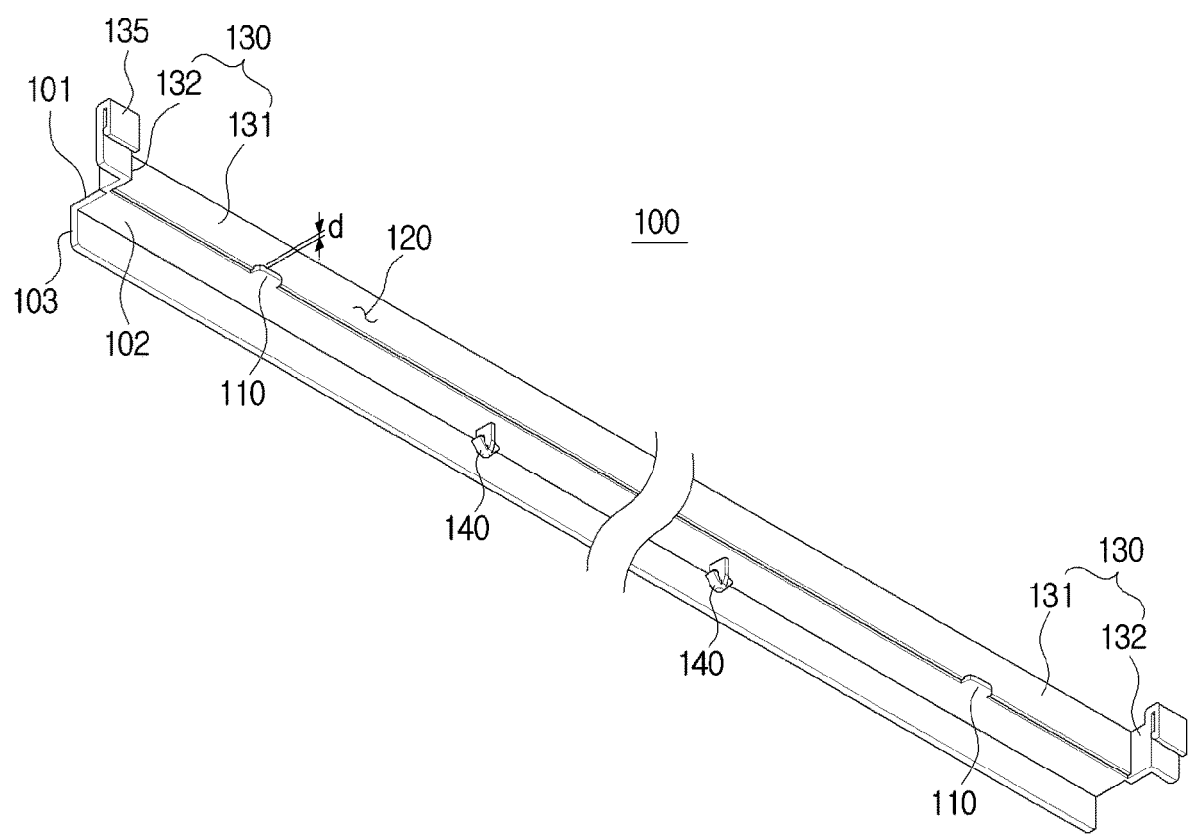
FIG. 4 is a perspective view of a rear surface of a coupling member of a display apparatus in accordance with an exemplary embodiment.
Figure 5:
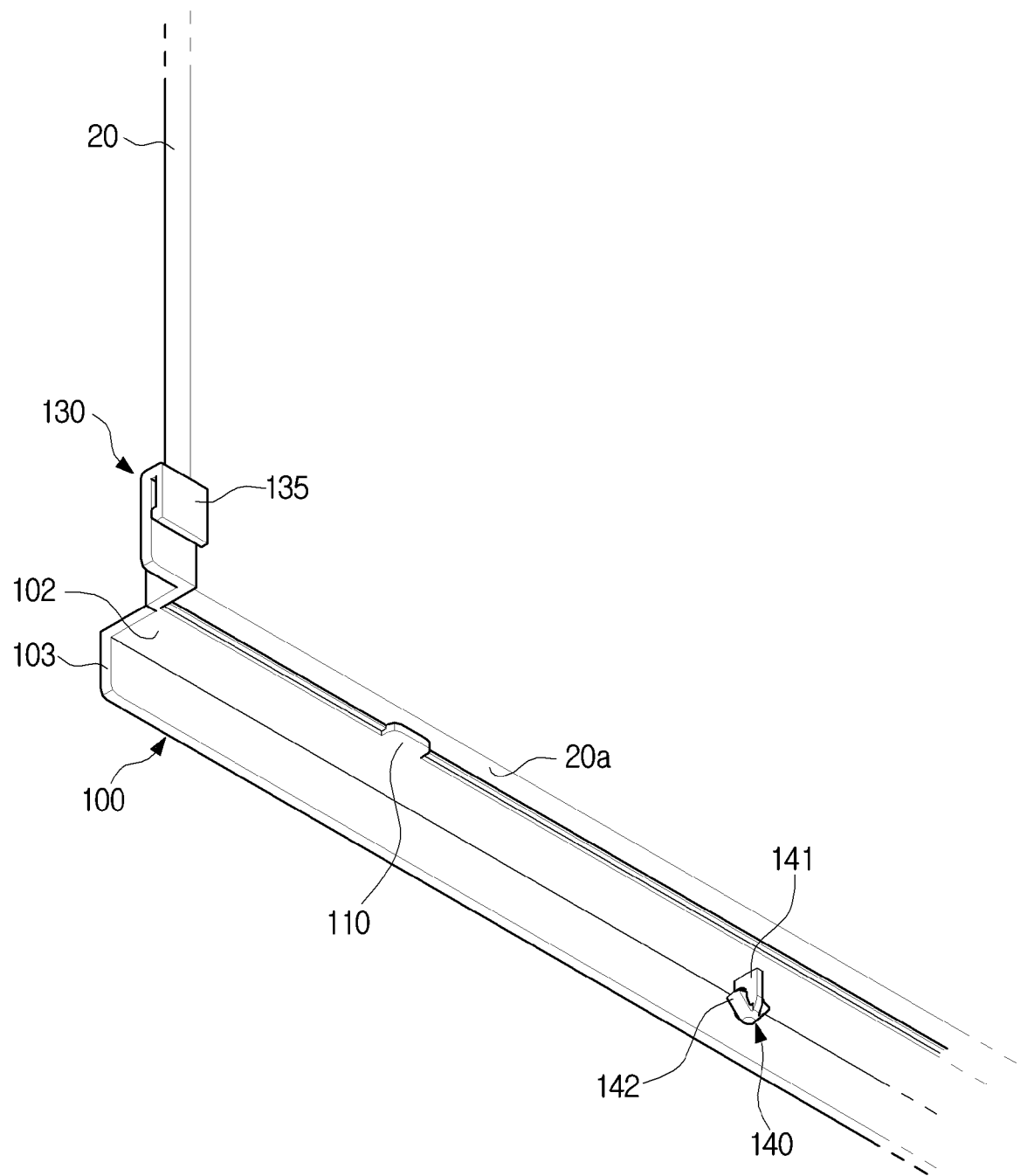
FIG. 5 is a diagram illustrating a state in which a light guide plate is coupled to a coupling member of a display apparatus in accordance with an exemplary embodiment.
Figure 6:
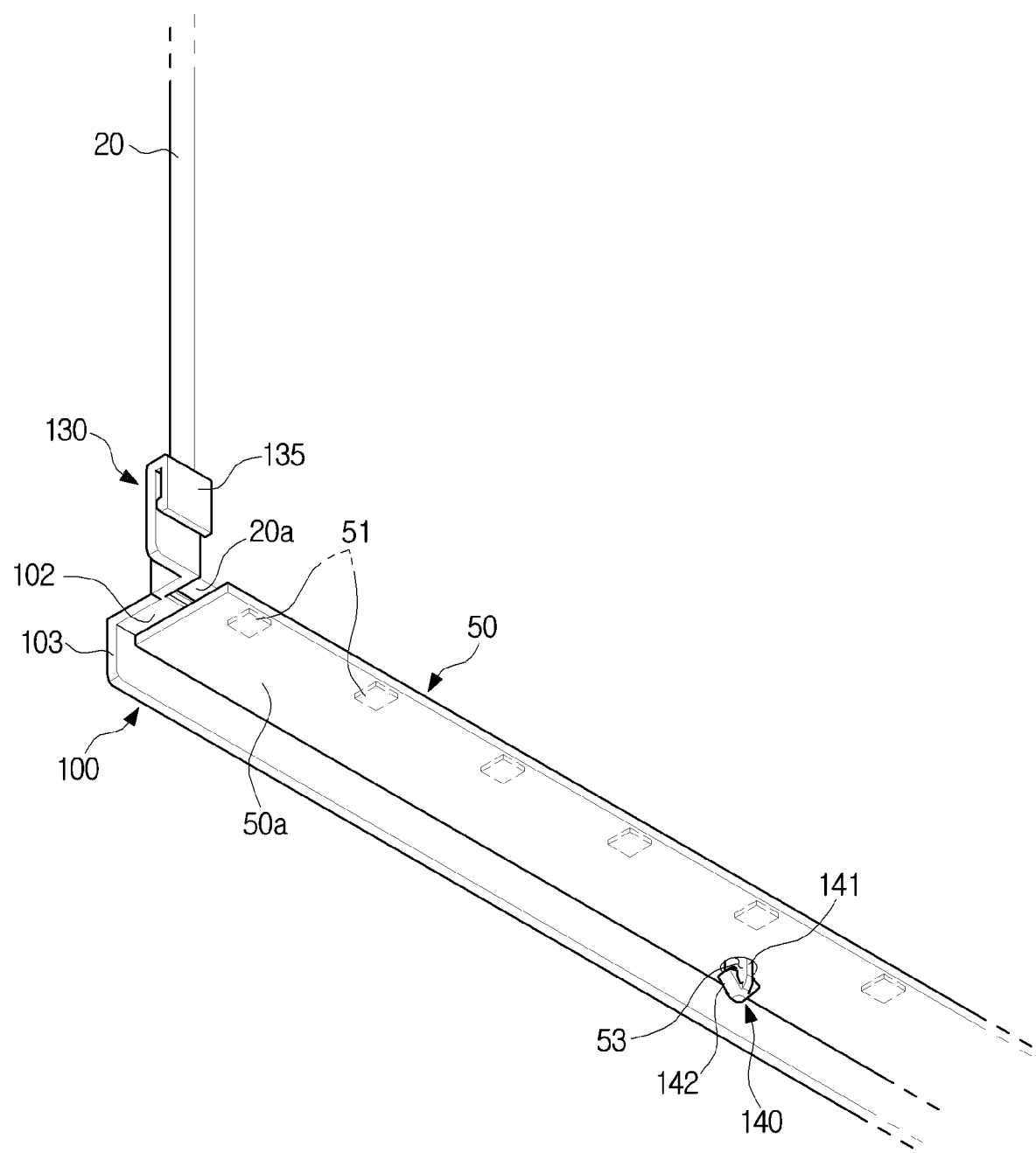
FIG. 6 is a diagram illustrating a state in which a light source module is coupled to a coupling member of a display apparatus in accordance with an exemplary embodiment.
Figure 7:
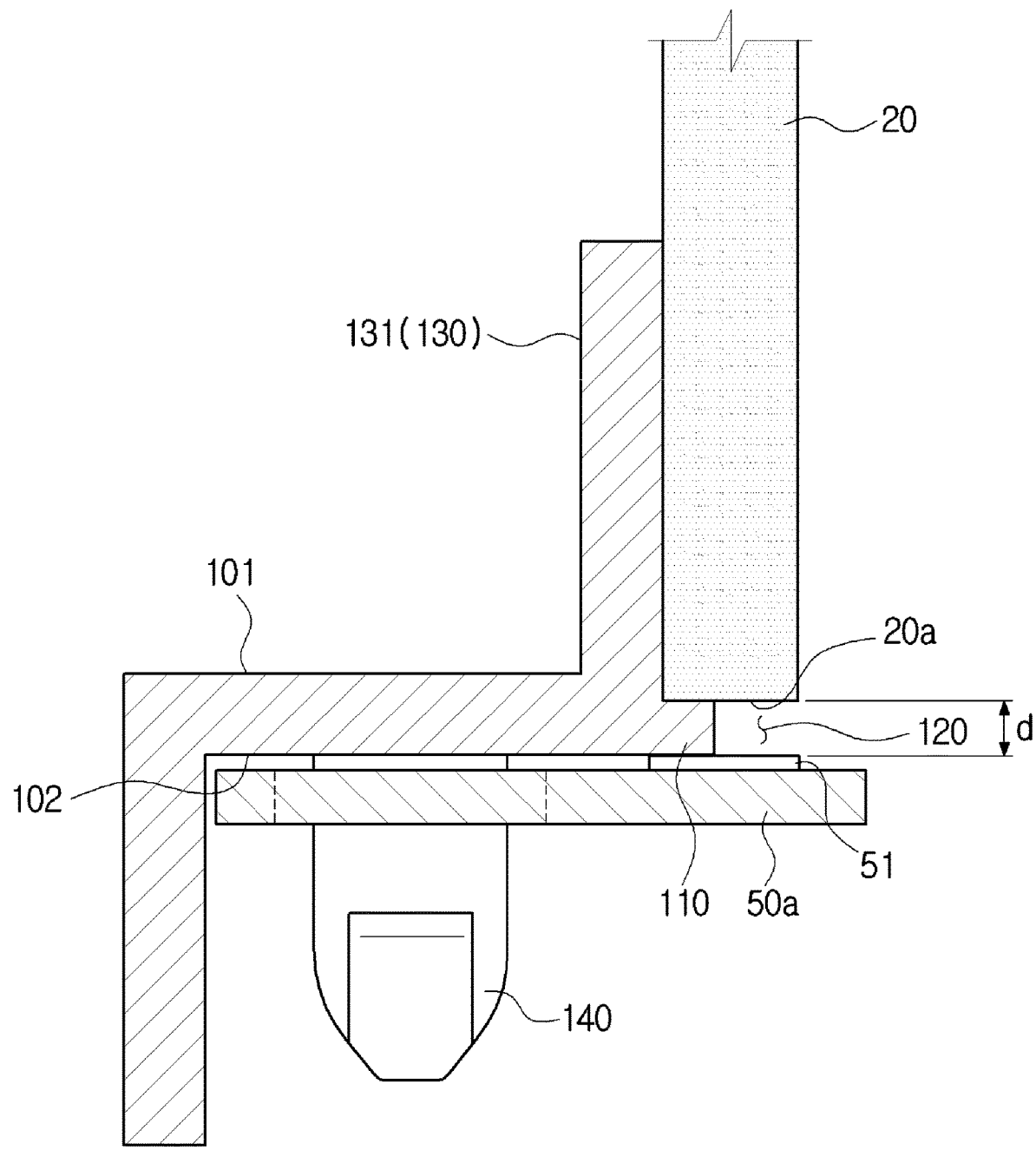
FIG. 7 is a cross-sectional view illustrating a state in which a light guide plate and a light source module are coupled to a coupling member of a display apparatus in accordance with an exemplary embodiment.
Figure 8:
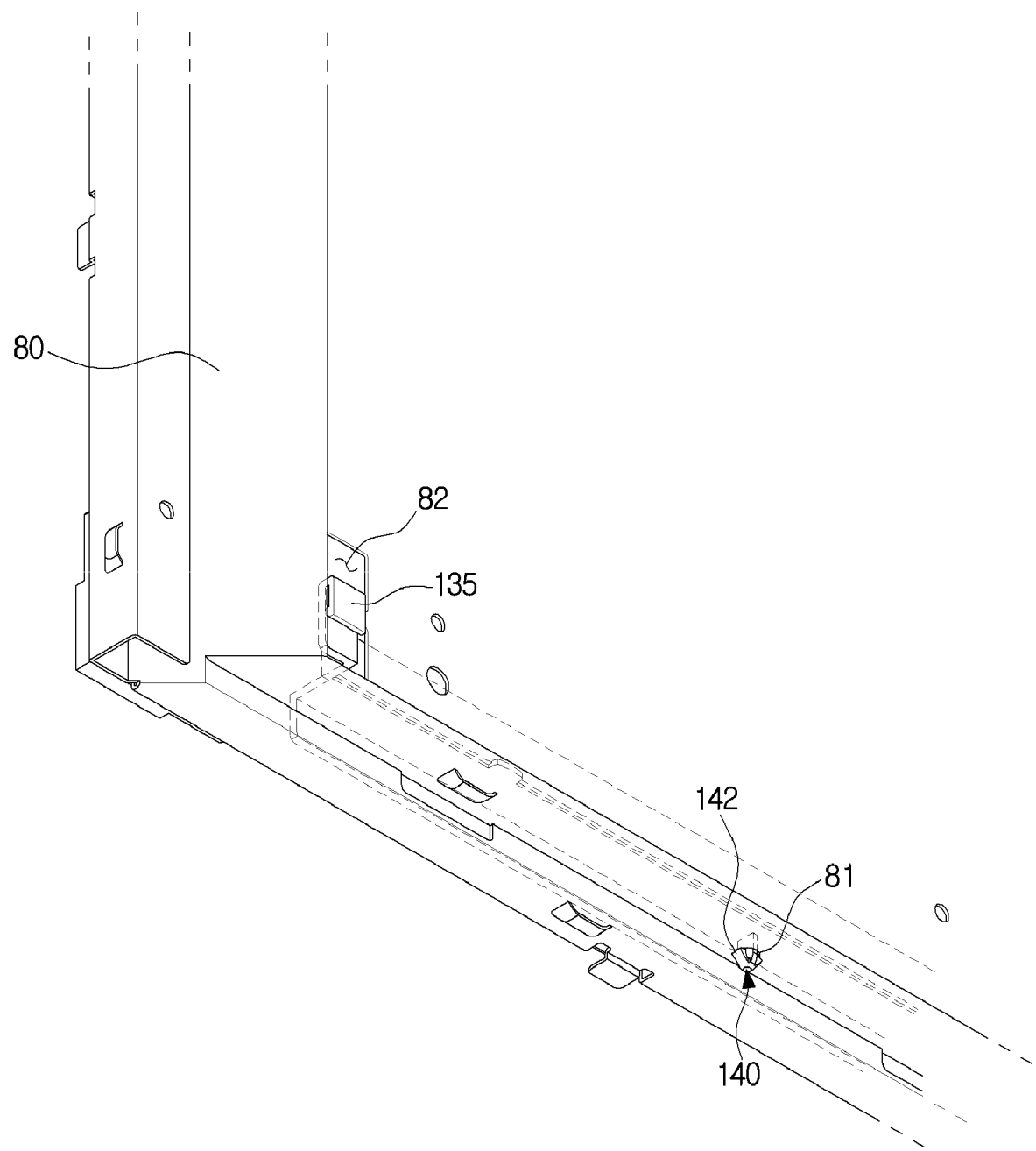
FIG. 8 is a diagram illustrating a state in which a bottom chassis is coupled to a coupling member of a display apparatus in accordance with an exemplary embodiment.

FIG. 3 is a side cross-sectional view of a lower side of a display apparatus in accordance with an exemplary embodiment. FIG. 4 is a perspective view of a rear surface of a coupling member of a display apparatus in accordance with an exemplary embodiment. FIG. 5 is a diagram illustrating a state in which a light guide plate is coupled to a coupling member of a display apparatus in accordance with an exemplary embodiment. FIG. 6 is a diagram illustrating a state in which a light source module is coupled to a coupling member of a display apparatus in accordance with an exemplary embodiment. FIG. 7 is a cross-sectional view illustrating a state in which a light guide plate and a light source module are coupled to a coupling member of a display apparatus in accordance with an exemplary embodiment. FIG. 8 is a diagram illustrating a state in which a bottom chassis is coupled to a coupling member of a display apparatus in accordance with an exemplary embodiment.

The coupling member 100 may support the light guide plate 20 and the light source module 50 instead of the middle mold, as described above. Furthermore, the coupling member 100 may support the bottom chassis 80.

In detail, the coupling member 100 may be located on a side surface of the display panel 10. In accordance with an exemplary embodiment, the coupling member 100 may be located on a lower surface of the display panel 10 to support the lower surface of the display panel 10 as illustrated in FIG. 3.

However, an exemplary embodiment is not limited thereto, and the coupling member 100 may be arranged on an upper side of the display panel 10 or a left or right side of the display panel 10. Alternatively, a pair of coupling members 100 may be arranged at upper and lower parts of the display panel 10 or at left and right parts of the display panel 10.

The coupling member 100 may include a first surface 101 supporting the light guide plate 20, and a second surface 102 which is opposite the first surface 101 and supports the light source module 50. The first surface 101 and the second surface 102 may have a certain thickness and be provided to face each other in a direction perpendicular to the display apparatus 1.

The coupling member 100 may include a support 110 provided between the first surface 101 and the second surface 102 and configured to support the light guide plate 20 at a side or an upper side thereof and support the light source module 50 at an opposite side or a lower side thereof.

The support 110 has a certain thickness d in a vertical direction, and thus may support the light guide plate 20 and the light source module 50 to be spaced the thickness d apart from each other.

That is, one lower surface 20a of the light guide plate 20 is supported while being in contact with the upper side of the support 110, and the light source module 50 is supported while being in contact with the lower side of the support 110. Thus, the lower surface 20a of the light guide plate 20 and the light source module 50 may be supported by the coupling member 100 such that they are spaced the thickness d of the support 110 apart from each other.

The support 110 may be arranged on a cut portion 120 through which the first surface 101 and the second surface 102 communicate with each other. The first surface 101 and the second surface 102 are spaced the certain thickness apart from each other. The first surface 101 and the second surface 102 may communicate with each other via an empty space formed by cutting the thickness between the first surface 101 and the second surface 102.

Because the support 110 is arranged on the cut portion 120, the cut portion 120 may be located between the light guide plate 20, which is arranged at a side of the support 110 corresponding to the first surface 101, and the light source module 50, which is arranged at an opposite side of the support 110 corresponding to the second surface 102.

In other words, the light guide plate 20 and the light source module 50 may be arranged on the cut portion 120 by the support 110, the lower surface 20a of the light guide plate 20 may be supported by the support 110, and the light source module 50 may be arranged to face the lower surface 20a of the light guide plate 20. Thus, light emitted from the plurality of light sources 51 of the light source module 50 may pass through the cut portion 120 and then be incident on the lower surface 20a of the light guide plate 20.

Thus, although the light guide plate 20 and the light source module 50 are respectively supported by the one side and the opposite side of the coupling member 100, the plurality of light sources 51 of the light source module 50 may emit light toward the lower surface 20a of the light guide plate 20 via the cut portion 120.

Furthermore, because the light guide plate 20 and the light source module 50 are arranged on the coupling member 100 to be respectively supported by the one side and the opposite side of the coupling member 100, the light guide plate 20 and the light source module 50 may be naturally spaced the thickness d of the support 110 apart from each other. Thus, any additional component may not be needed to constantly maintain a distance between the lower surface 20a of the light guide plate 20 and the light source module 50.

In related art, both the light guide plate and the light source module are provided to be supported inside edges of the middle mold, and thus cannot be supported such that a distance between a side surface of the light guide plate and the light source module is maintained constant. This is because an additional supporting component is not provided between the side surface of the light guide plate and the light source module. When an additional component is provided to solve this problem, the number of processes and manufacturing costs increase.

In contrast, the coupling member 100 in accordance with an exemplary embodiment may be provided such that the light guide plate 20 and the light source module 50 are respectively arranged on the first surface 101 and the second surface 102 through the support 110, and the light guide plate 20 and the light source module 50 are supported to be continuously spaced the thickness d of the support 110 apart from each other as described above.

Accordingly, the light guide plate 20 and the light source module 50 are in contact with the support 110 even when an external force is applied to the display apparatus 1, and thus the distance between the light guide plate 20 and the light source module 50 may be maintained constant.

Furthermore, because the distance between the light guide plate 20 and the light source module 50 may be maintained stable and constant, the light source module 50 may efficiently emit light toward the side surface of the light guide plate 20. Accordingly, efficiency of the light source module 50 increases, and the light source module 50 may thus exhibit performance corresponding to that of a light source module in accordance with related art even when the number of light sources 51 is less than that of light sources in accordance with related art.

Thus, the light source module 50 may include the plurality of light sources 51, the number of which is less than that of light sources of a light source module in accordance with related art. Thus, the light source module 50 may be efficiently driven and the number of light sources 51 to be mounted may be decreased, thereby decreasing manufacturing costs of the display apparatus 1.

The coupling member 100 may include a storage portion 130 extending from the first surface 101 and configured to store the support 110 and the light guide plate 20. The storage portion 130 may include a first wall 131 extending from the first surface 101 in a longitudinal direction of the light guide plate 20 to support a front surface of the light guide plate 20, and second walls 132 extending from opposite ends of the first wall 131 to support opposite side surfaces of the light guide plate 20.

As illustrated in FIG. 5, the first wall 131 and the second walls 132 may support a front surface and opposite side surfaces of a lower end of the light guide plate 20, and the support 110 may support the lower surface 20*a* of the light guide plate 20. A rear side surface of the light guide plate 20 may be supported by the bottom chassis 80 located behind the light guide plate 20 (see FIG. 3).

That is, the light guide plate 20 may be supported by the storage portion 130 and the support 110 in a state in which the light guide plate 20 is stored in the storage portion 130. Thus, the light guide plate 20 may be fixed inside the display apparatus 1 without the middle mold in accordance with related art.

A lower side part of the light guide plate 20 on which light from the light source module 50 is incident may be supported by being stored in the storage portion 130 as described above. In this case, the first wall 131 and the second walls 132 of the storage portion 130 support the lower side part of the light guide plate 20 while covering a portion of the lower side part of the light guide plate 20. Thus, the storage portion 130 may prevent a light bouncing phenomenon from occurring on the lower surface 20*a* of the light guide plate 20 on which the light from the plurality of light sources 51 is incident.

That is, the lower surface 20*a* of the light guide plate 20 may be located close to the plurality of light sources 51. Accordingly, when light is emitted from the plurality of light sources 51, the amount of light incident on the lower surface 20*a* of the light guide plate 20 may be greater than that of light incident on the other parts thereof. Thus, a light bouncing phenomenon in which the lower surface 20*a* of the light guide plate 20 appears to be brighter than the other parts thereof may occur. However, in accordance with an exemplary embodiment, the coupling member 100 covers the lower side part of the light guide plate 20 close to the lower surface 20*a* on which the light bouncing phenomenon may occur, and thus the occurrence of the light bouncing phenomenon may be prevented.

Furthermore, as the storage portion 130 is provided to cover edges of the lower surface 20*a* of the light guide plate 20, the light emitted from the plurality of light sources 51 may be concentrated on the lower surface 20*a* of the light guide plate 20 without causing part of the light to be emitted to the outside, thereby increasing efficiency of the light source module 50.

Thus, the coupling member 100 may guide light generated by the light source module 50 to the lower surface 20*a* of the light guide plate 20 to increase the efficiency of the light source module 50.

The coupling member 100 may include coupling protrusions 140 extending from the second surface 102 and coupled to the light source module 50. The coupling protrusions 140 may be in a protrusion form extending from the second surface 102 to the lower side of the display apparatus 1, and be provided to pass through first through holes 53 formed in the light source module 50.

As illustrated in FIG. 6, the light source module 50 may include a substrate 50*a* on which the plurality of light sources 51 are mounted, and the first through holes 53 through which the coupling protrusions 140 pass may be provided in the substrate 50*a*. Thus, the coupling protrusions 140 may pass through the substrate 50*a* of the light source module 50 to be coupled to the light source module 50.

In detail, each of the coupling protrusions 140 may include a first stopper 141 configured to be caught by and coupled to the first through hole 53 after the coupling protrusion 140 passes through the first through hole 53 (see FIG. 5). Thus, a side of the first through hole 53 is caught by and coupled to the first stopper 141 such that the light source module 50 is supported by the coupling protrusions 140.

The substrate 50*a* of the light source module 50 may be in contact with a bottom surface of the support 110 in a state in which the first stoppers 141 are coupled to the first through holes 53. Thus, the light source module 50 may be supported to be in contact with the coupling member 100 without separation to be stably coupled to the coupling member 100.

As illustrated in FIG. 7, the plurality of light sources 51 may be arranged on the substrate 50*a* so that the plurality of light sources 51 may be located on the cut portion 120 when the substrate 50*a* of the light source module 50 is in contact with the support 110. Thus, when the light source module 50 is coupled to the coupling member 100, the plurality of light sources 51 may emit light toward the lower surface 20*a* of the light guide plate 20 via the cut portion 120.

Because the substrate 50*a* of the light source module 50 is arranged to be spaced the thickness d of the support 110 apart from the lower surface 20*a* of the light guide plate 20, the plurality of light sources 51 may emit light toward the lower surface 20*a* of the light guide plate 20 in a state in which the plurality of light sources 51 are separated by a predetermined distance from the lower surface 20*a* of the light guide plate 20.

As illustrated in FIG. 8, the bottom chassis 80 may include a second through hole 81 through which the coupling protrusion 140 passes in a lower side thereof. Thus, the coupling protrusion 140 may pass through the bottom chassis 80 to be coupled to the bottom chassis 80.

In detail, the coupling protrusion 140 may include a second stopper 142 configured to be caught by and coupled to a side of the second through hole 81 after the coupling protrusion 140 passes through the second through hole 81 (see FIG. 5). Thus, the side of the second through hole 81 is caught by and coupled to the second stopper 142 such that the bottom chassis 80 is supported by the coupling protrusion 140.

In related art, a side of the bottom chassis is coupled to the middle mold to be supported by the middle mold and the top chassis. In contrast, the display apparatus 1 in accordance with an exemplary embodiment does not include the middle mold, and thus the bottom chassis 80 may be supported by an additional component. However, the coupling protrusion 140 of the coupling member 100 is capable of supporting the bottom chassis 80 as well as the light source module 50. Accordingly, the bottom chassis 80 may be easily supported without an additional component.

A third through hole 82 may be provided in a rear side of the bottom chassis 80, through which a PCB support 135 extending from the second wall 132 may pass. The PCB support 135 may support the PCB 12 of the display panel 10 when the CoF 11 is bent backward to be located behind the bottom chassis 80 (see FIG. 3).

Furthermore, the coupling member 100 may include an extension surface 103 which is bent from the second surface 102 and extends to the lower side of the display apparatus 1 (see FIG. 4). The extension surface 103 may extend to the lower side of the display apparatus 1 to support the bottom chassis 80. Thus, a coupling force between the coupling member 100 and the bottom chassis 80 may increase.

Figure 9:
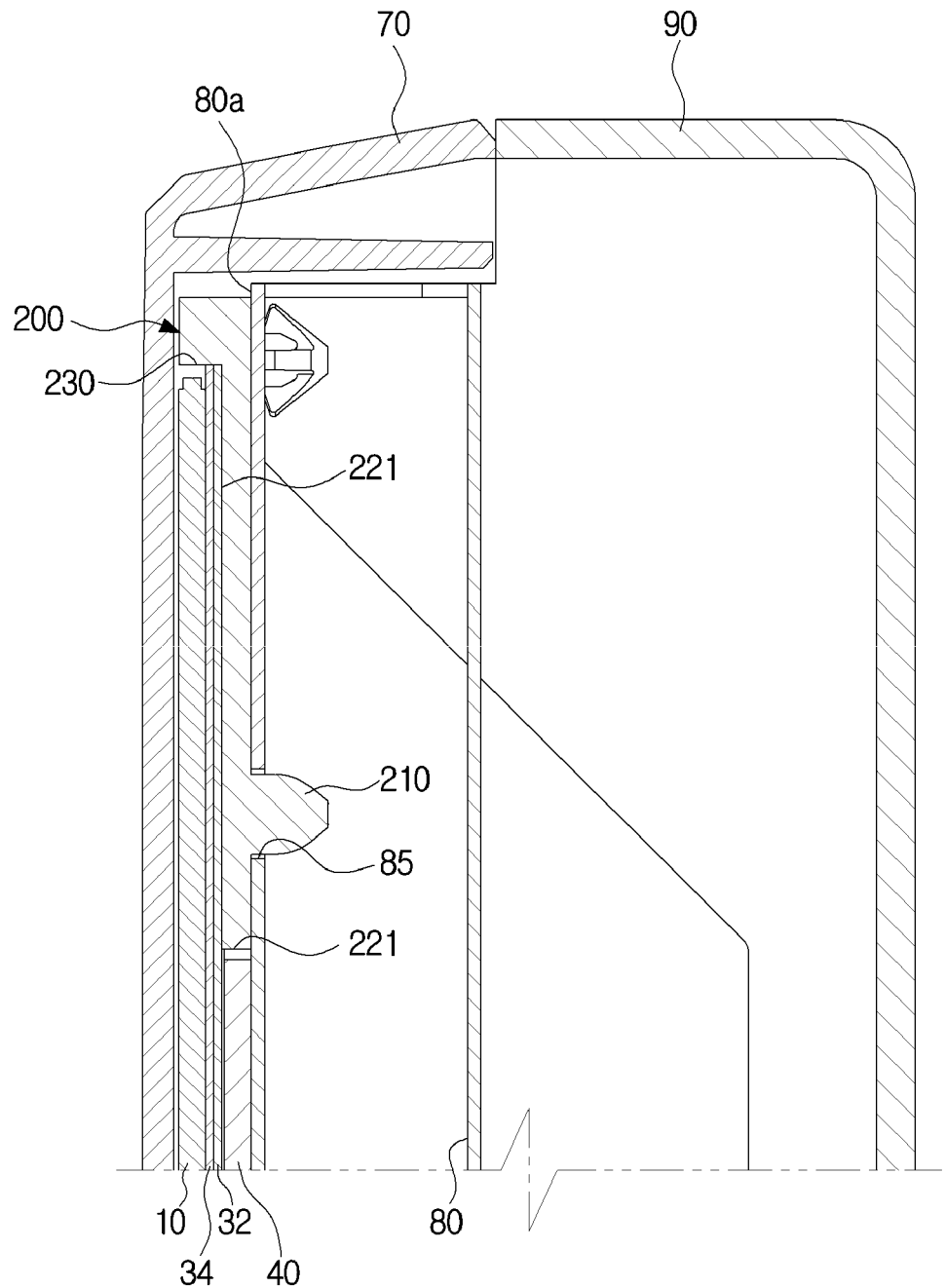
FIG. 9 is a side cross-sectional view of an upper side of a display apparatus in accordance with an exemplary embodiment.
Figure 10:
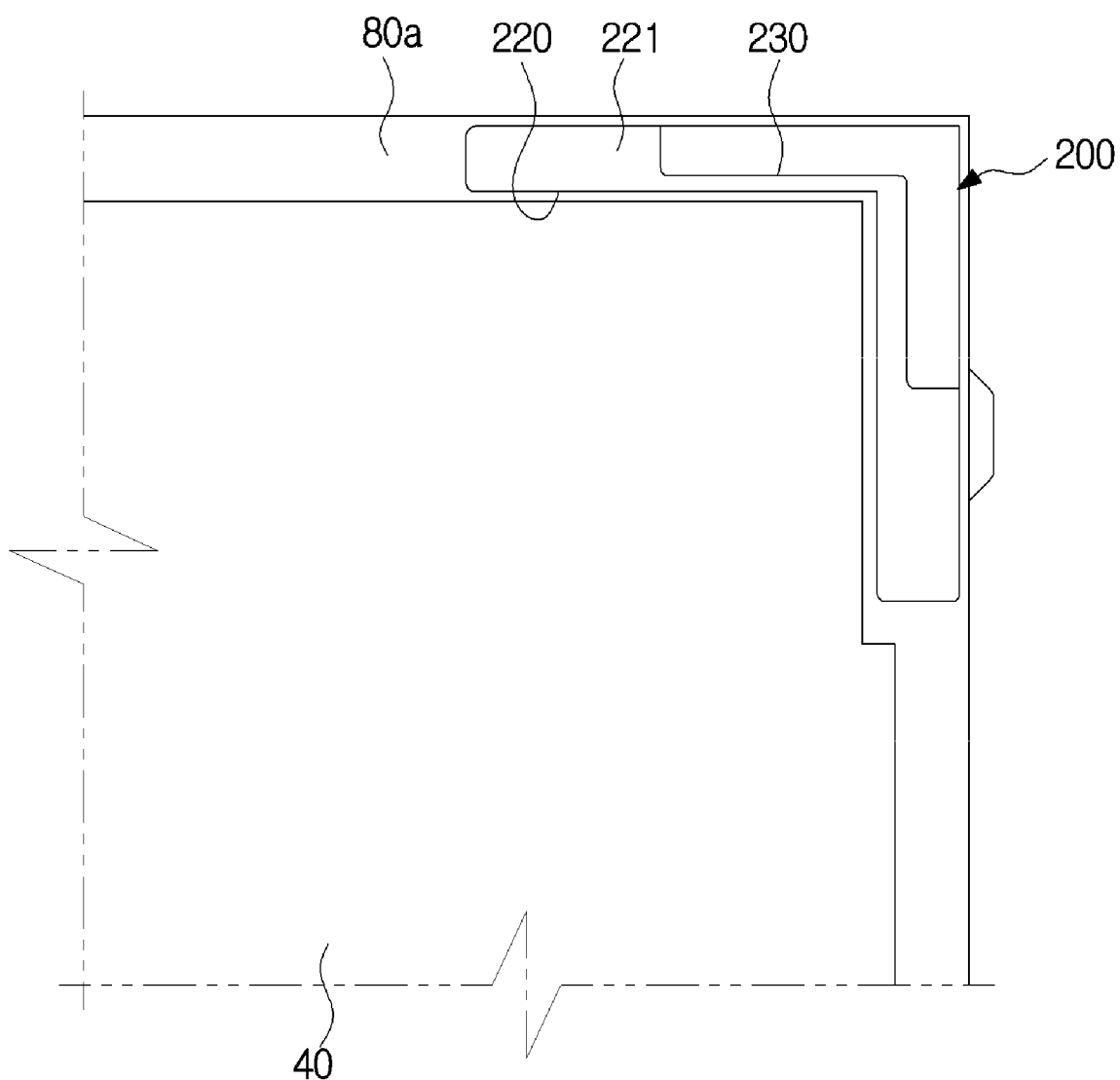
FIG. 10 is a front view of a support member of a display apparatus in accordance with an exemplary embodiment.
Figure 11:
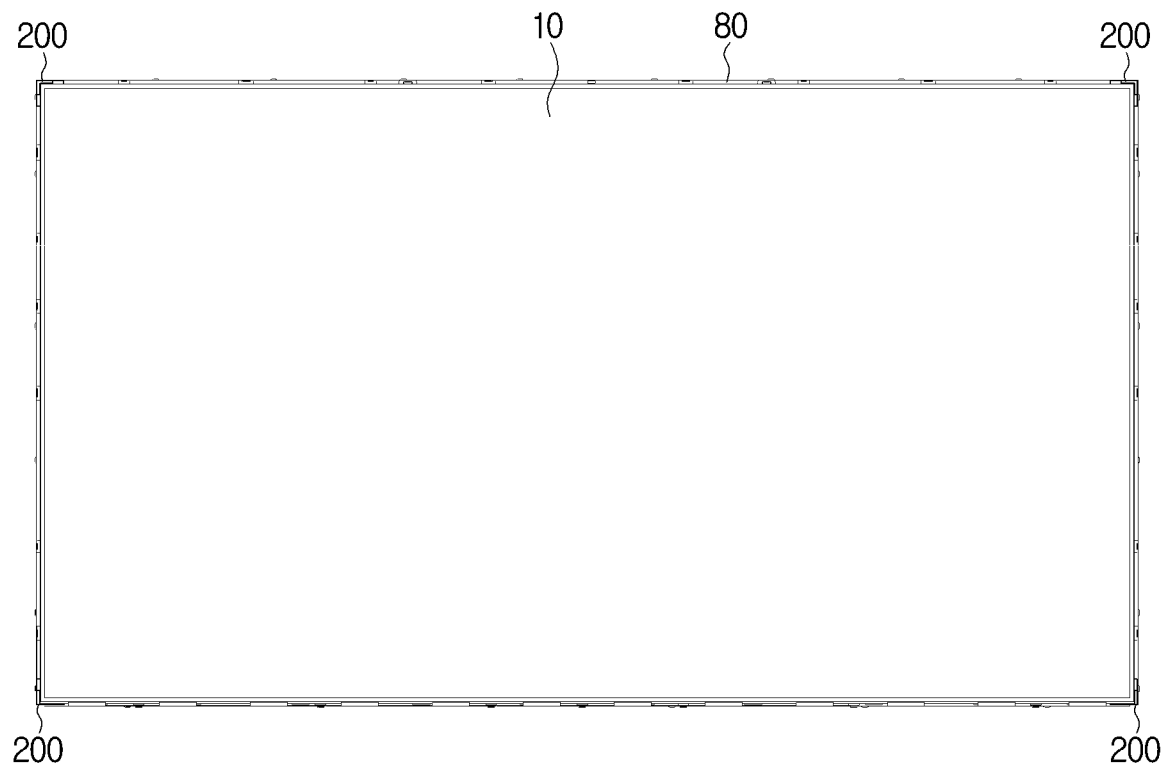
FIG. 11 is a front view of a display apparatus in accordance with an exemplary embodiment from which a top chassis is removed.

Support members 200 configured to support the display panel 10 will be described in detail below. FIG. 9 is a side cross-sectional view of an upper side of a display apparatus in accordance with an exemplary embodiment. FIG. 10 is a front view of a support member of a display apparatus in accordance with an exemplary embodiment. FIG. 11 is a front view of a display apparatus in accordance with an exemplary embodiment from which a top chassis is removed.

In related art, a display panel may be supported and fixed on a front surface of the middle mold. In contrast, as described above, the display apparatus 1 in accordance with an exemplary embodiment does not include the middle mold, and thus the light guide plate 20, the light source module 50, and the bottom chassis 80 may be supported by the coupling member 100, however a problem may occur when the display panel 10 is supported.

To solve this problem, the display panel 10 may include the support members 200 which are supported by a front surface 80a of the bottom chassis 80 extending to the rear surface of the display panel 10 and which are coupled to the bottom chassis 80 of the display apparatus 1 and arranged at corners of the display panel 10 to support the corners of the display panel 10 to prevent the display panel 10 from being separated from the front surface 80a of the bottom chassis 80.

In detail, as illustrated in FIG. 9, the display panel 10, the optical sheet 30 on the rear surface of the display panel 10, and the diffusion plate 40 on a rear surface of the optical sheet 30 may be supported by the front surface 80a of the bottom chassis 80 extending to the rear surface of the display panel 10 behind the light guide plate 20.

The display panel 10, the optical sheet 30, and the diffusion plate 40 are stacked together in a structure from front to back such that a rear surface of the diffusion plate 40 at the tail of the structure may be supported by the front surface 80a of the bottom chassis 80. Thus, all of the diffusion plate 40, the optical sheet 30, and the display panel 10 may be supported by the front surface 80a of the bottom chassis 80.

The top chassis 70 may be provided in front of the display panel 10 to pressurize the display panel 10 toward the front surface 80a of the bottom chassis 80, thereby assisting the support of the display panel 10, the optical sheet 30, and the diffusion plate 40 by the front surface 80a of the bottom chassis 80.

The top chassis 70 may be coupled to the cover member 90 while being pressurized toward the front surface 80a of the bottom chassis 80 of the display panel 10.

The support members 200 may be coupled to the front surface 80a of the bottom chassis 80 to prevent the display panel 10 located between the top chassis 70 and the bottom chassis 80 from being separated in a vertical or horizontal direction.

The support member 200 may include a coupling part 210 protruding toward the front surface 80a of the bottom chassis 80. A front-surface through hole 85 may be provided in the front surface 80a of the bottom chassis 80. The coupling part 210 may pass through the front-surface through hole 85 such that the support member 200 is coupled to the front surface 80a of the bottom chassis 80.

The support member 200 may be bent by about 90 degrees to have a curved part corresponding to one of the corners of the display panel 10, as illustrated in FIG. 10. The support member 200 may include a first inner sidewall 220 inside the curved part to support a side surface of the diffusion plate 40.

Although not shown, the optical sheet 30 and the display panel 10 may be stacked on a front surface of the diffusion plate 40. The support member 200 may include a second inner sidewall 230 supporting side surfaces of the display panel 10, the optical sheet 30, and the diffusion plate 40.

Each of the first inner sidewall 220 and the second inner sidewall 230 may be arranged to have a step. The step is for supporting the side surfaces of the display panel 10 and the optical sheet 30 stacked with the diffusion plate 40 in consideration of a thickness of the diffusion plate 40.

Because parts of the optical sheet 30 and the display panel 10 which are wider than the diffusion plate 40 cannot be supported by the front surface 80a of the bottom chassis 80 when areas of the optical sheet 30 and the display panel 10 are greater than that of the diffusion plate 40 in accordance with an exemplary embodiment, the support member 200 may include an auxiliary support surface 221 between the first inner sidewall 220 and the second inner sidewall 230 to prevent such a situation.

That is, each of the first inner sidewall 220 and the second inner sidewall 230 may be formed to have a step. The auxiliary support surface 221 may be provided in a form vertically connecting the first inner sidewall 220 and the second inner sidewall 230 between the first inner sidewall 220 and the second inner sidewall 230.

The first inner sidewall 220 may have a height corresponding to the thickness of the diffusion plate 40. Thus, the diffusion plate 40 and the first inner sidewall 220 may have the same height, rear surfaces of the optical sheet 30 and the display panel 10 in front of the diffusion plate 40 may be supported by the front surface of the diffusion plate 40 and the auxiliary support surface 221, and side surfaces of the optical sheet 30 and the display panel 10 may be supported by the second inner sidewall 230.

However, exemplary embodiments are not limited thereto, and the support member 200 may have one inner sidewall having no step to simultaneously support the side surfaces of the diffusion plate 40, the optical sheet 30, and the display panel 10.

As illustrated in FIG. 11, the support members 200 may be arranged at the four corners of the display panel 10 such that the corners of the display panel 10 may be supported by the support member 200.

Thus, the display panel 10, the optical sheet 30, and the diffusion plate 40 may be stably supported between the top chassis 70 and the bottom chassis 80 without separation.

Coupling members 100' and 100" of the display apparatus 1 in accordance with exemplary embodiments will be described below. A structure of the display apparatus 1 is the same as that of the display apparatus 1 in accordance with the one exemplary embodiment described above except the coupling members 100' and 100" and will not be redundantly described.

Figure 12:
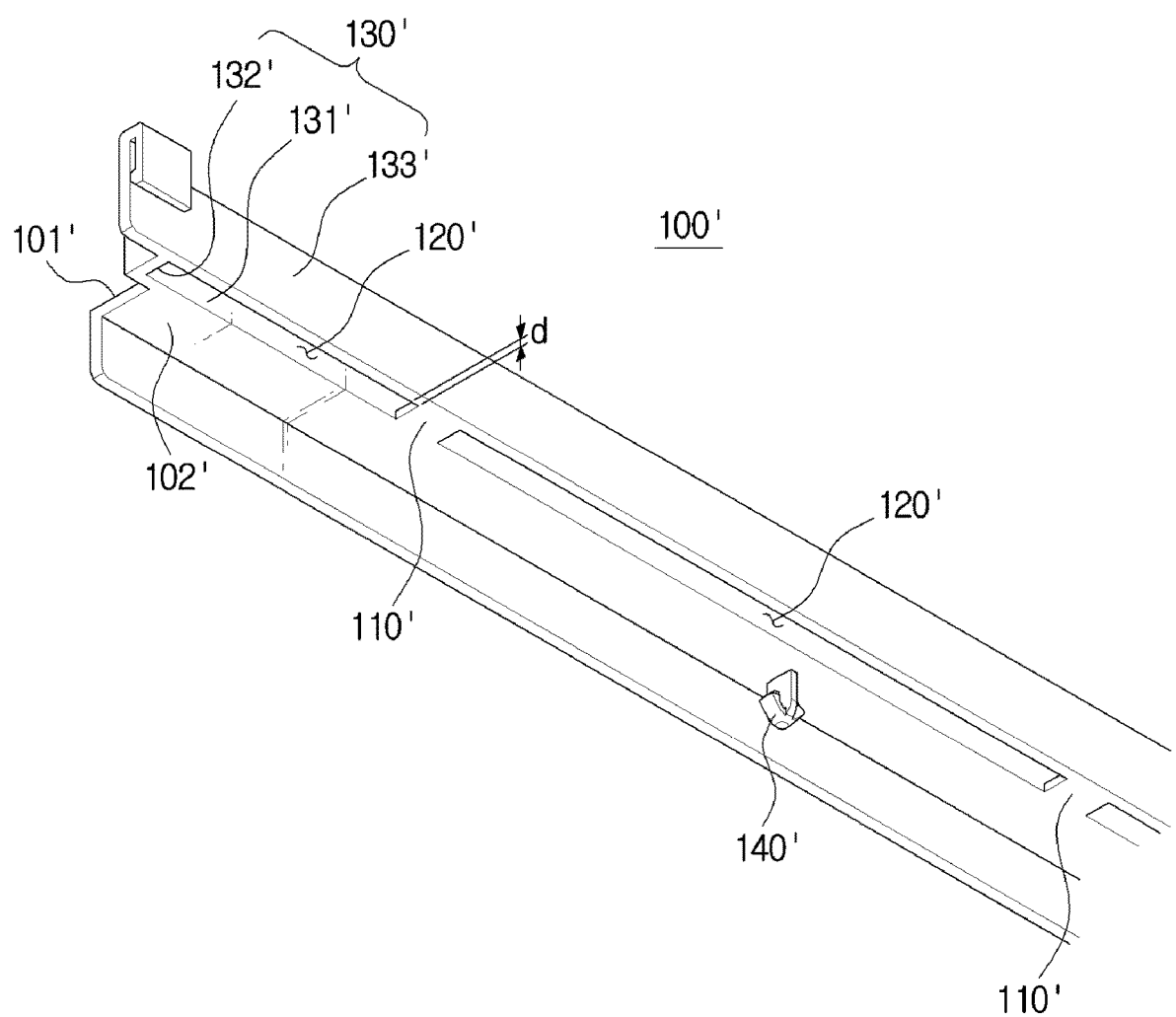
FIG. 12 is a perspective view of a rear surface of a coupling member of a display apparatus in accordance with another exemplary embodiment.
Figure 13:
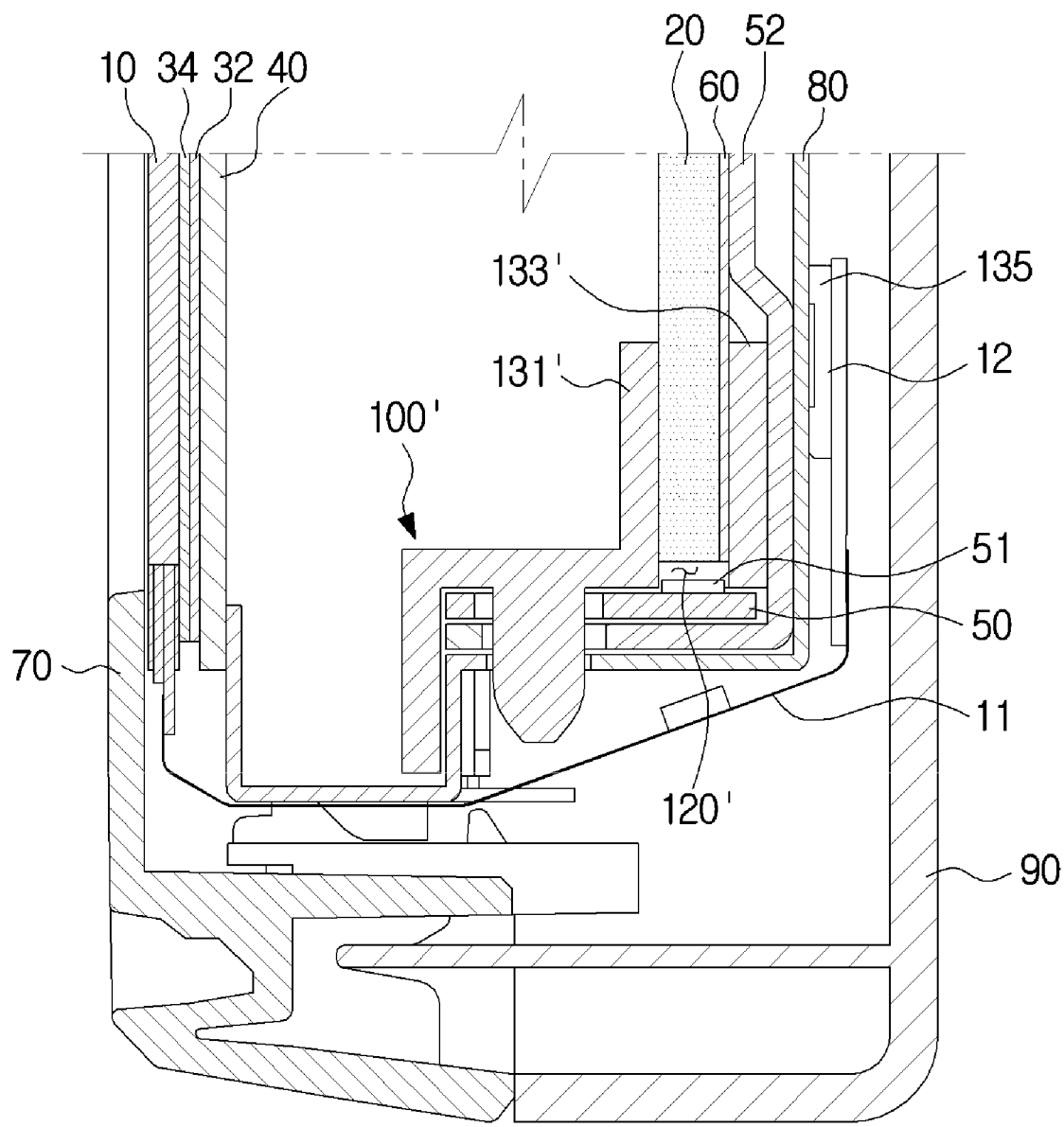
FIG. 13 is a cross-sectional view of a lower side of a display apparatus in accordance with another exemplary embodiment.
Figure 14:
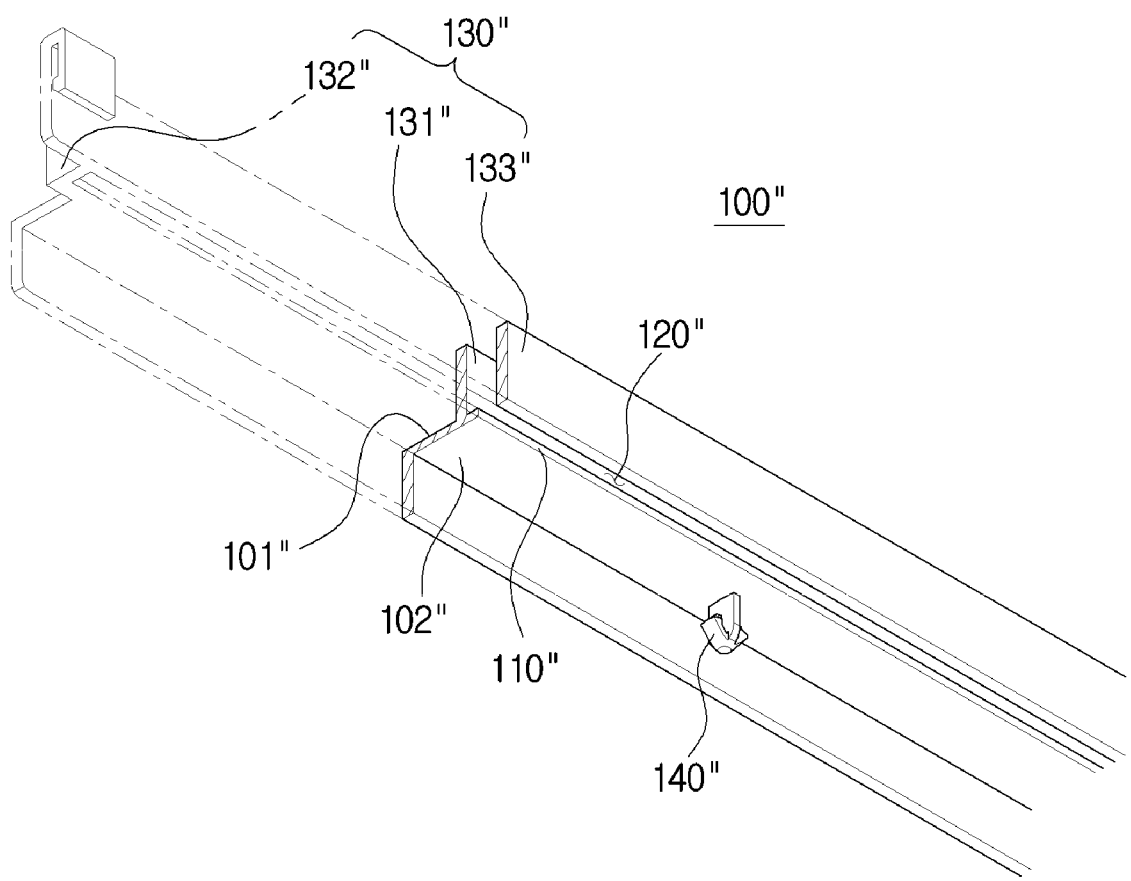
FIG. 14 is a perspective view of a rear surface of a coupling member of a display apparatus in accordance with another exemplary embodiment.

FIG. 12 is a perspective view of a rear surface of a coupling member of a display apparatus in accordance with another exemplary embodiment. FIG. 13 is a cross-sectional view of a lower side of a display apparatus in accordance with another exemplary embodiment. FIG. 14 is a perspective view of a rear surface of a coupling member of a display apparatus in accordance with another exemplary embodiment.

As illustrated in FIGS. 12 and 13, a storage portion 130' extending from a first surface 101' of the coupling member 100' may include a first wall 131', a second wall 132', and a third wall 133' which is parallel to the first wall 131'.

The first wall 131' and the third wall 133' may be arranged to be parallel and spaced apart from each other. The second wall 132' may be in a form connecting opposite ends of the first wall 131' and the third wall 133'.

Thus, a lower side of a light guide plate 20 may be stored in an inner space formed by the first wall 131', the second wall 132', and the third wall 133'. As four surfaces of the lower side of the light guide plate 20 are supported by the storage portion 130', the light guide plate 20 may be stably supported by the coupling member 100'.

A cut portion 120' may be provided in the inner space formed by the first wall 131', the second wall 132', and the third wall 133'. A support 110' located on the cut portion 120' may be in a form extending between the first wall 131' and the third wall 133'.

Thus, the light guide plate 20 and a light source module 50 may be respectively provided on an upper surface and a lower surface of the support 110' to be coupled to the coupling member 100' in a state in which the light guide plate 20 and the light source module 50 are spaced a thickness d of the support 110' apart from each other.

A plurality of light sources 51 are provided on the cut portion 120' in the support 110' such that light is emitted toward the light guide plate 20 via the cut portion 120'.

As illustrated in FIG. 14, a storage portion 130" extending from a first surface 101" of the coupling member 100" may include a first wall 131", a second wall 132", and a third wall 133" which is parallel to the first wall 131".

The first wall 131" and the third wall 133" are spaced apart from each other and parallel to each other. The second wall 132" may be in a form connecting opposite ends of the first wall 131" and the third wall 133".

Thus, the lower side of the light guide plate 20 may be stored in an inner space formed by the first wall 131", the second wall 132", and the third wall 133". As four surfaces of the lower side of the light guide plate 20 are supported by the storage portion 130", a light guide plate 20 may be stably supported by the coupling member 100".

A cut portion 120" may be provided in the inner space formed by the first wall 131", the second wall 132", and the third wall 133". A support 110" located on the cut portion 120" may extend in a flange form from the first wall 131" to the cut portion 120".

Thus, the support 110" may have a length corresponding to a longitudinal direction of the first wall 131". An entire length of the support 110" corresponding to the longitudinal direction of the first wall 131" may extend to the cut portion 120".

The light guide plate 20 and a light source module 50 may be respectively provided on an upper surface and a lower surface of the support 110" to be coupled to the coupling member 100' in a state in which the light guide plate 20 and the light source module 50 are spaced a thickness d of the support 110" apart from each other.

A plurality of light sources 51 may be provided on the cut portion 120" in the support 110" such that light is emitted toward the light guide plate 20 via the cut portion 120".

A coupling member 300 of a display apparatus 1 in accordance with another exemplary embodiment will be described below. A structure of the display apparatus 1 is the same as that of the display apparatus 1 in accordance with the one exemplary embodiment described above except the coupling member 300 and will not be redundantly described.

Figure 15:
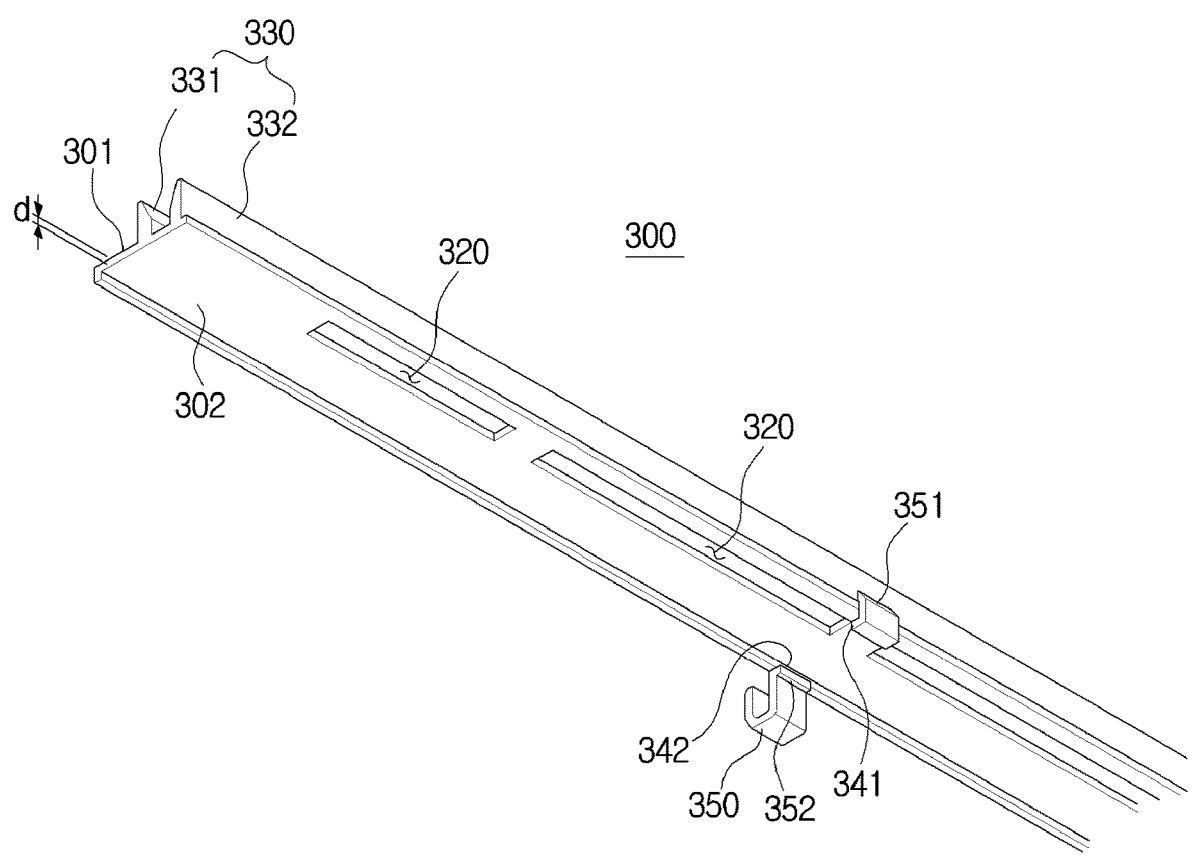
FIG. 15 is a perspective view of a rear surface of a coupling member of a display apparatus in accordance with another exemplary embodiment.
Figure 16:
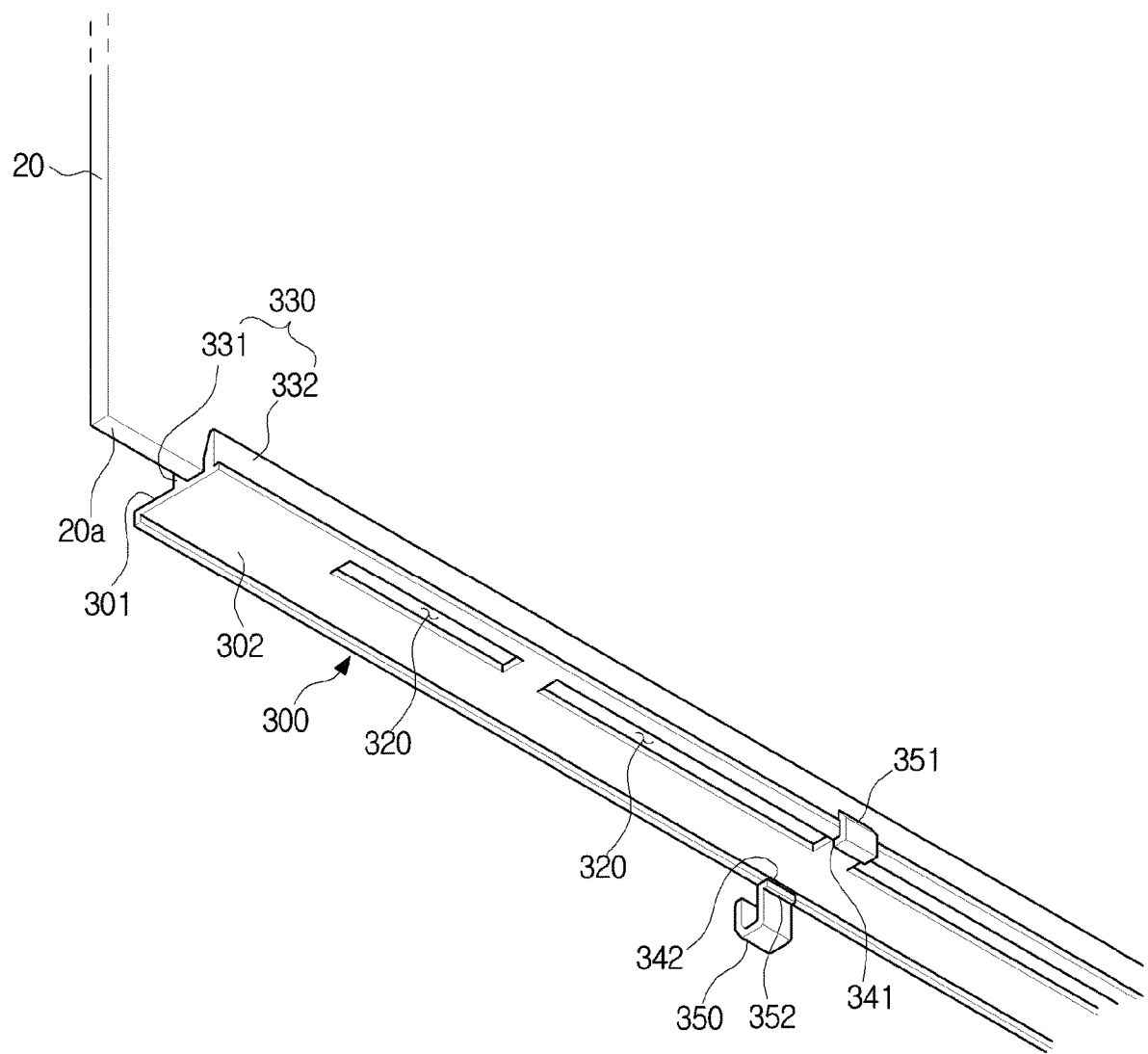
FIG. 16 is a diagram illustrating a state in which a light guide plate is coupled to a coupling member of a display apparatus in accordance with another exemplary embodiment.
Figure 17:
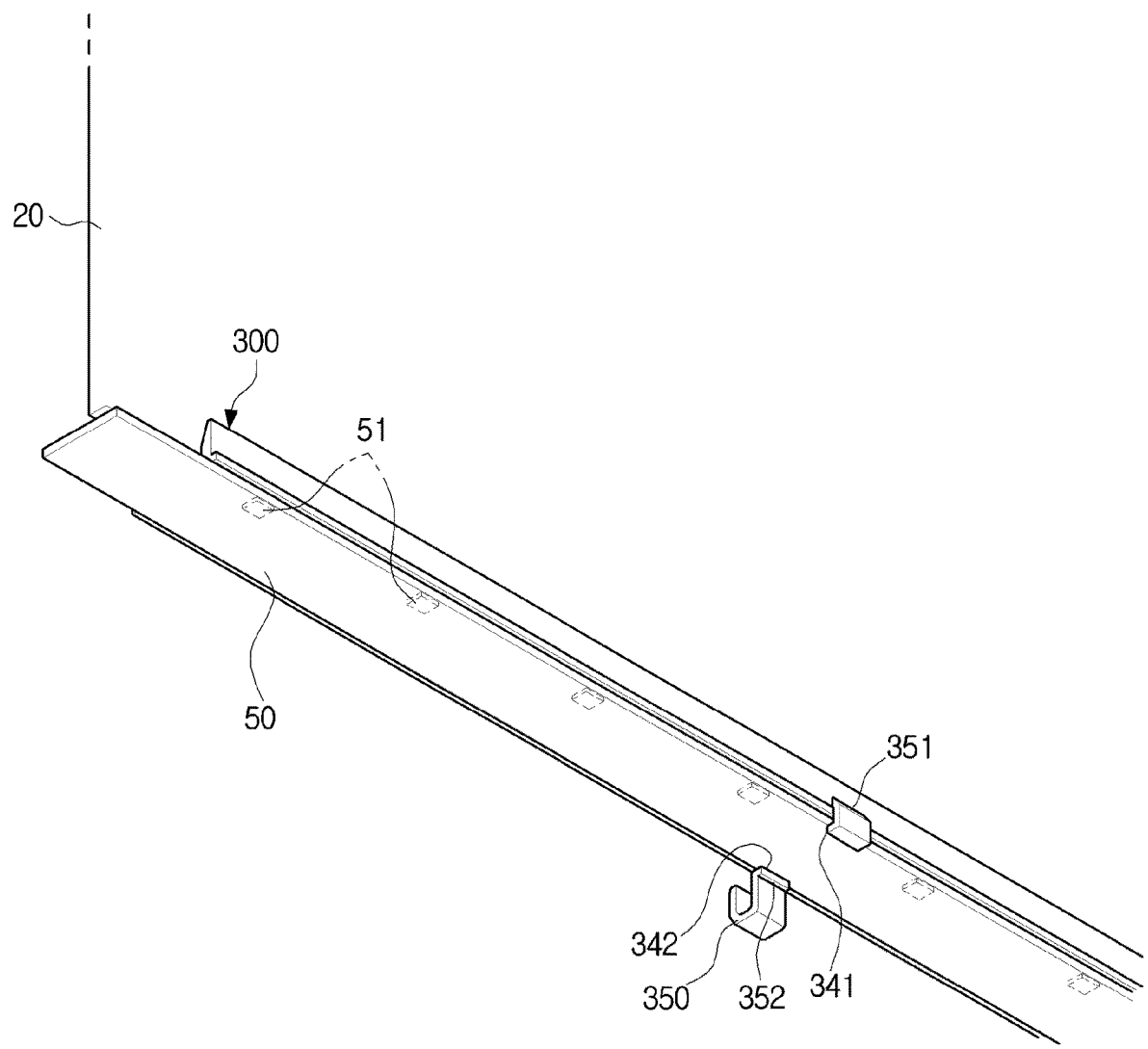
FIG. 17 is a diagram illustrating a state in which a light source module is coupled to a coupling member of a display apparatus in accordance with another exemplary embodiment.
Figure 18:
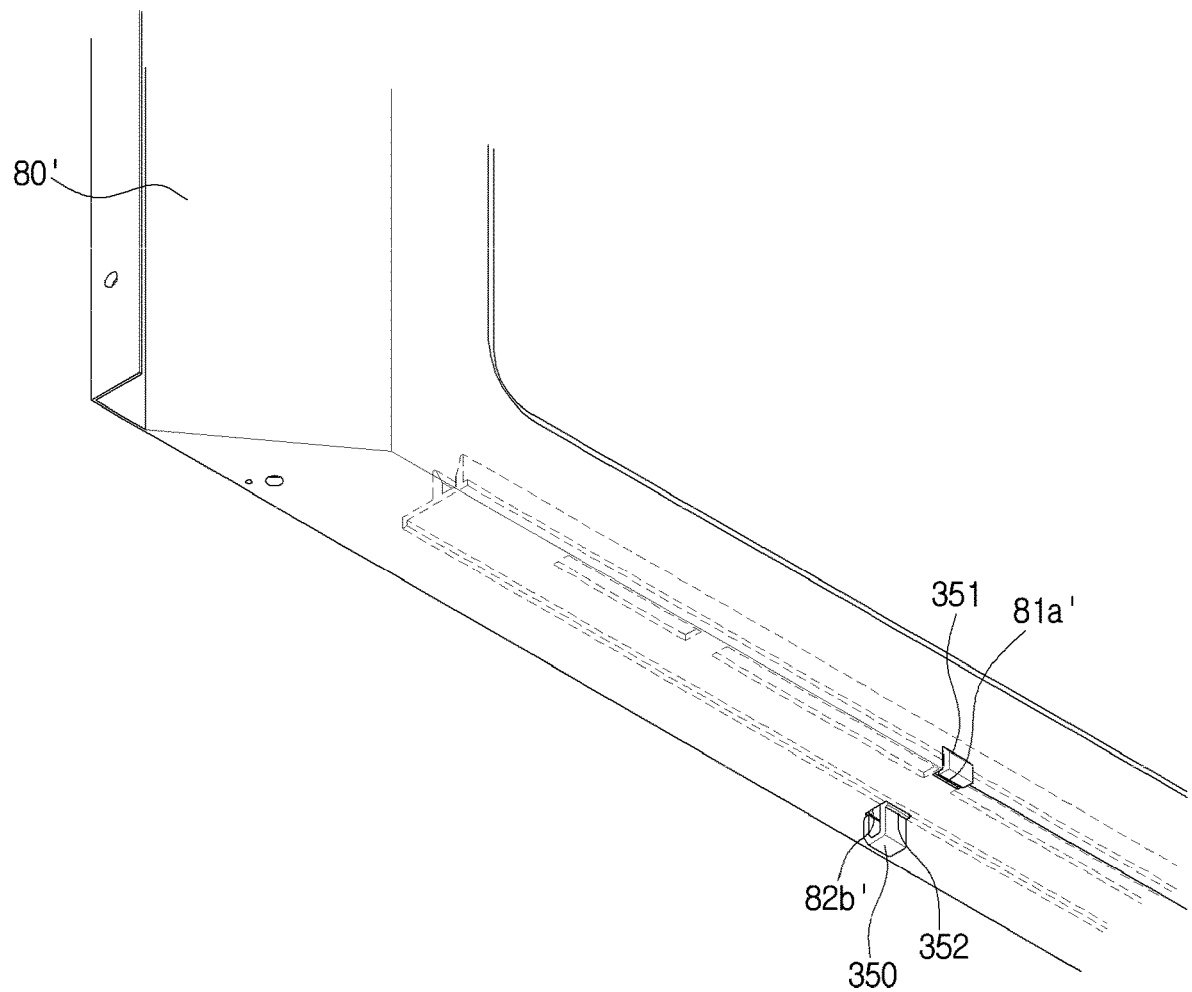
FIG. 18 is a diagram illustrating a state in which a bottom chassis is coupled to a coupling member of a display apparatus in accordance with another exemplary embodiment.
Figure 19:
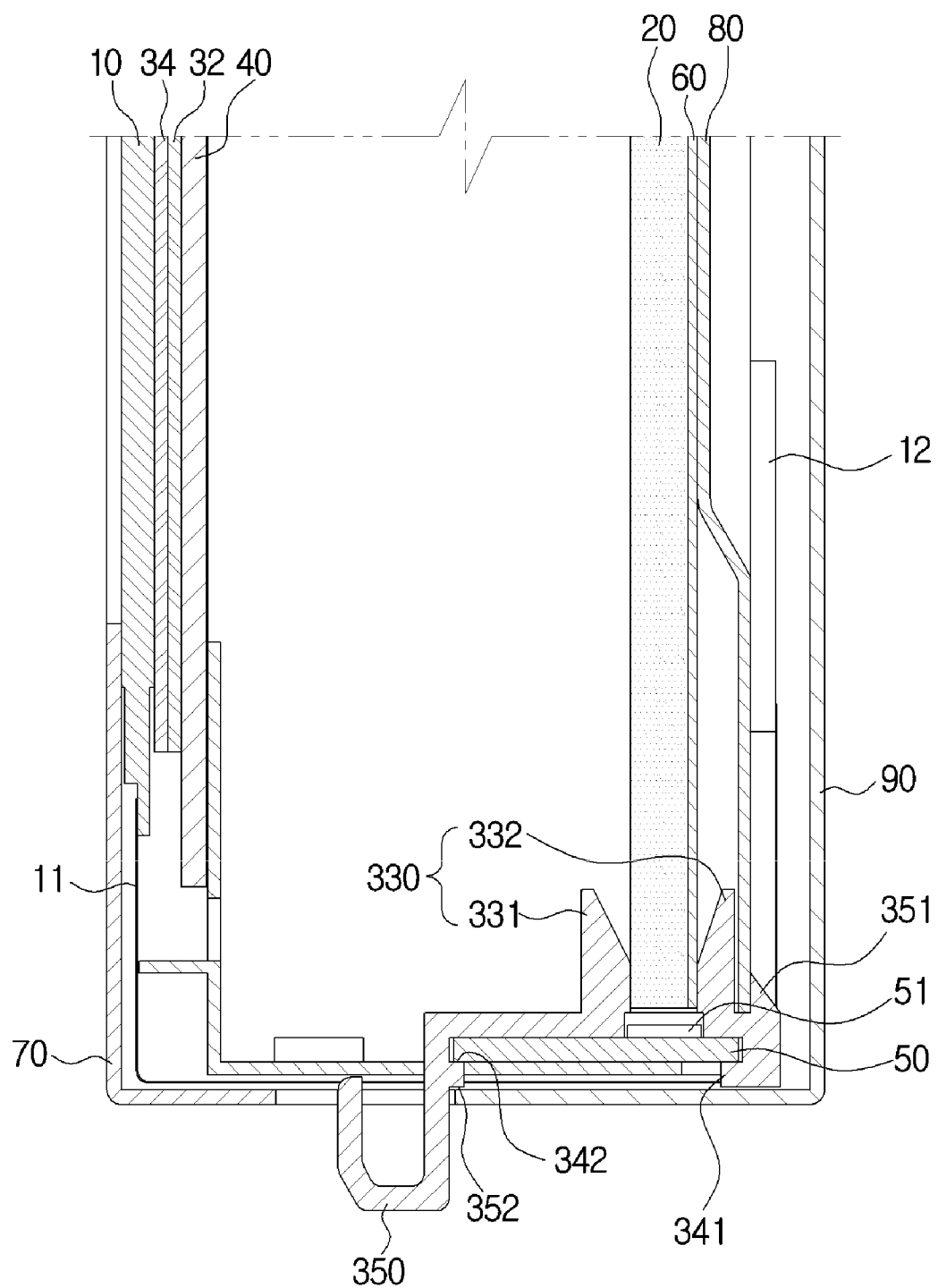
FIG. 19 is a side cross-sectional view of a lower side of a display apparatus in accordance with another exemplary embodiment.

FIG. 15 is a perspective view of a rear surface of a coupling member of a display apparatus in accordance with another exemplary embodiment. FIG. 16 is a diagram illustrating a state in which a light guide plate is coupled to a coupling member of a display apparatus in accordance with another exemplary embodiment. FIG. 17 is a diagram illustrating a state in which a light source module is coupled to a coupling member of a display apparatus in accordance with another exemplary embodiment. FIG. 18 is a diagram illustrating a state in which a bottom chassis is coupled to a coupling member of a display apparatus in accordance with another exemplary embodiment. FIG. 19 is a side cross-sectional view of a lower side of a display apparatus in accordance with another exemplary embodiment.

The coupling member 300 may include a first surface 301 supporting a light guide plate 20, and a second surface 302 which is opposite the first surface 301 and supports a light source module 50. The first surface 301 and the second surface 302 may be provided to face each other in a vertical direction with respect to the display apparatus 1 while being spaced a thickness d apart from each other.

Unlike in the one exemplary embodiment, because the light guide plate 20 is in direct contact with the first surface 301 and the light source module 50 is in direct contact with the light guide plate 20, the coupling member 300 may support the light guide plate 20 and the light source module 50 to be separated by the thickness d between the first surface 301 and the second surface 302, as illustrated in FIG. 15.

As the first surface 301 and the second surface 302 are spaced the thickness d apart from each other, the coupling member 300 may include cut portions 320 which are empty spaces formed by cutting the thickness d between the first surface 301 and the second surface 302 and through which the first surface 301 and the second surface 302 communicate with each other.

In the coupling member 300, the light guide plate 20 and the light source module 50 are provided on the cut portions 320 such that the light source module 50 faces a lower surface 20a of the light guide plate 20 to make light emitted from a plurality of light sources 51 of the light source module 50 pass through the cut portions 320 and be incident on the lower surface 20a of the light guide plate 20.

Thus, although the light guide plate 20 and the light source module 50 are respectively supported by one side of the coupling member 300 and a side opposite to the one side, the plurality of light sources 51 of the light source module 50 may emit light toward the lower surface 20a of the light guide plate 20 via the cut portions 320.

The coupling member 300 may include a storage portion 330 extending from the first surface 301 and configured to store the light guide plate 20. The storage portion 330 may include a first wall 331 extending from the first surface 301 in a longitudinal direction of the light guide plate 20 and configured to support the front surface of the light guide plate 20, and a second wall 332 facing the first wall 131, spaced apart from the first wall 131, and supporting a rear surface of the light guide plate 20.

As illustrated in FIG. 16, the first wall 331 and the second wall 332 may support the front and rear surfaces of the light guide plate 20, and the first surface 301 may support the lower surface 20a of the light guide plate 20. That is, the light guide plate 20 may be supported by the storage portion 330 and the first surface 301 while being stored in the storage portion 330.

As illustrated in FIG. 17, the coupling member 300 may include hook portions 341 and 342 configured to be hook-coupled to the light source module 50.

The hook portions 341 and 342 may extend downward from the second surface 302 and be configured to be hook-coupled to front and rear ends of a substrate 50a of the light source module 50 to fix the light source module 50 to the second surface 302.

The hook portions 341 and 342 may include the first hook portion 341 and the second hook portion 342. Both the first hook portion 341 and the second hook portion 342 may be hook-coupled to the light source module 50, or one of the first and second hook portions 341 and 342 may be hook-coupled to the light source module 50 and the other hook portion may support the light source module 50.

Thus, the substrate 50a of the light source module 50 may be stably coupled to the coupling member 300 while facing the second surface 302.

The plurality of light sources 51 may be arranged on the substrate 50a to be located on the cut portions 320 when the substrate 50a of the light source module 50 is coupled to the second surface 302. Thus, when the light source module 50 is coupled to the coupling member 300, the plurality of light sources 51 may emit light toward the lower surface 20a of the light guide plate 20 via the cut portions 320.

Because the substrate 50a of the light source module 50 is spaced the thickness d of the first surface 301 and the second surface 302 apart from the lower surface 20a of the light guide plate 20, the plurality of light sources 51 may emit light toward the lower surface 20a of the light guide plate 20 and be spaced a predetermined distance from the lower surface 20a.

As illustrated in FIG. 18, a bottom chassis 80' may be hook-coupled to the coupling member 300 at a lower side thereof. The coupling member 300 may include a first coupling hook 351 and a second coupling hook 352 to be hook-coupled to the bottom chassis 80'.

The bottom chassis 80' may include a first coupling hole 81a' and a second coupling hole 81b' through which the first coupling hook 351 and the second coupling hook 352 pass through the bottom chassis 80' to be hook-coupled to.

The first coupling hook 351 may be hook-coupled to a side of the first coupling hole 81a' after passing through the first coupling hole 81a'. The second coupling hook 352 may be hook-coupled to a side of the second coupling hole 81b' after passing through the second coupling hole 81b'.

The coupling member 300 may include a coupling protrusion 350 extending to a lower side of the second surface 302. The second coupling hook 352 and the second hook portion 342 may be located on the coupling protrusion 350, and may be provided to pass through the second coupling hole 81b'.

Alternatively, the second coupling hook 352 may support the bottom chassis 80' coupled to the first coupling hook 351 without being hook-coupled to the second coupling hole 81b'. That is, only one side of the bottom chassis 80' may be coupled to the first coupling hook 351 and the other side thereof may be supported by the coupling protrusion 350 including the second coupling hook 352.

Thus, as illustrated in FIG. 19, although the display apparatus 1 in accordance with another exemplary embodiment does not include a middle mold, the light guide plate 20 may be supported by an upper surface of the coupling member 300 and the light source module 50 and the bottom chassis 80' may be supported by a lower surface of the coupling member 300, thereby efficiently supporting inner components of the display apparatus 1.

In a display apparatus in accordance with the present disclosure, a light guide plate and a light source module may be effectively supported using a coupling member without a middle mold, thereby simplifying a structure of the display apparatus. Furthermore, a distance between the light guide plate and the light source module may be effectively maintained to improve performance of the display apparatus.

The present disclosure is not limited to the exemplary embodiments set forth herein, and it should be apparent to those skilled in the art that various changes and modifications may be made without departing from the idea of the present disclosure. Thus, it should be understood that all changes and modifications are included in the technical scope as defined in the claims.

What is claimed is:

1. A display apparatus comprising:
a display panel configured to display an image;
a light source module including a plurality of light sources;
a light guide plate configured to guide light generated by the light source module to the display panel; and
a coupling member comprising:
a first surface configured to contact the light guide plate;
a second surface configured to support the light source module, the second surface being disposed opposite the first surface, wherein a plane of the second surface intersects a plane of the first surface; and
a support provided between the first surface and the second surface and configured to support the light guide plate spaced apart from the light source module,
wherein the coupling member further comprises a cut portion located between the first surface and the second surface, and
wherein the plurality of light sources are located proximate to the cut portion and are configured to emit light toward a side surface of the light guide plate through the cut portion.

2. The display apparatus according to claim 1, wherein a side surface of the light guide plate is located at a first side of the support, and the light source module is located at a second side of the support.

3. The display apparatus according to claim 1, wherein the support is disposed in the cut portion.

4. The display apparatus according to claim 1, wherein the first surface comprises a storage portion configured to support a side surface of the light guide plate,
wherein the storage portion comprises at least two walls configured to support at least a portion of the side surface of the light guide plate.

5. The display apparatus according to claim 1, wherein the second surface comprises a coupling protrusion configured to pass through the light source module and couple to the light source module.

6. The display apparatus according to claim 5, further comprising a chassis disposed behind the light guide plate, and
wherein the coupling protrusion is configured to pass through the chassis and couple to the chassis.

7. The display apparatus according to claim 1, further comprising a chassis located behind the light guide plate, and wherein the second surface comprises a first coupling hook configured to pass through a first side of the chassis and couple to the chassis.

8. The display apparatus according to claim 7, wherein the second surface comprises a second coupling hook configured to pass through a second side of the chassis and couple to the chassis.

9. The display apparatus according to claim 8, wherein the chassis comprises:
a first hole configured to accommodate the first coupling hook; and
a second hole configured to accommodate the second coupling hook.

10. The display apparatus according to claim 1, wherein the second surface comprises a hook portion configured to couple to the light source module.

11. The display apparatus according to claim 1, wherein the coupling member is located on a side surface of the light guide plate.

12. The display apparatus according to claim 1, wherein the coupling member comprises a first coupling member and a second coupling member, the first coupling member being located on a first side surface of the light guide plate and the second coupling member being located on a second side surface of the light guide plate, the first side surface being disposed opposite the second side surface.

13. The display apparatus according to claim 1, further comprising:
a chassis located behind the light guide plate; and
a support member located on a front surface of the chassis and configured to support a side surface of the display panel.

14. The display apparatus of claim 1, wherein the plane of the first surface intersects the plane of the second surface at a non-zero angle.

15. The display apparatus of claim 1, wherein the plane of the first surface is perpendicular to the plane of the second surface.

16. The display apparatus of claim 1, wherein the second surface comprises a coupling protrusion configured to pass through a first hole included in the light source module,
wherein the display apparatus further comprises a chassis disposed behind the light guide plate, the chassis comprising a second hole, and
wherein the coupling protrusion is configured to be inserted into the second hole after being inserted into the first hole.

17. A display apparatus comprising:
a display panel configured to display an image;
a light source module including a plurality of light sources;
a light guide plate configured to guide light generated by the light source module to the display panel; and
a coupling member comprising:
a first surface configured to support the light guide plate;
a second surface configured to support the light source module, the second surface being disposed opposite the first surface and oriented away from the first surface; and
a support provided between the first surface and the second surface and configured to support the light guide plate spaced apart from the light source module,
wherein the coupling member further comprises a cut portion located between the first surface and the second surface, wherein the plurality of light sources are located proximate to the cut portion and are configured to emit light toward a side surface of the light guide plate through the cut portion,
wherein the second surface comprises a coupling protrusion configured to pass through the light source module and couple to the light source module,
wherein the display apparatus further comprises a chassis disposed behind the light guide plate,
wherein the coupling protrusion is configured to pass through the chassis and couple to the chassis
wherein the light source module comprises a first hole configured to accommodate the coupling protrusion,
the chassis comprises a second hole configured to accommodate the coupling protrusion, and
the coupling protrusion is configured to be inserted into the second hole after being inserted into the first hole.

18. A display apparatus comprising:
a display panel configured to display an image;
a top chassis located in front of the display panel;
a light source module including a plurality of light sources;
a light guide plate configured to guide light generated by the light source module to the display panel;
a bottom chassis located behind the light guide plate and coupled to the top chassis; and
a coupling member located between the top chassis and the bottom chassis,
wherein the coupling member comprises:
a first side configured to contact the light guide plate; and
a second side disposed opposite the first side, the second side being configured to support the light source module, a plane of the second side intersecting with a plane of the first side,
wherein the coupling member further comprises a cut portion located between the first side and the second side, and
wherein the plurality of light sources are located proximate to the cut portion and are configured to emit light toward a side surface of the light guide plate through the cut portion.

19. The display apparatus according to claim 18, wherein the first side and the second side of the coupling member are spaced a distance apart from each other, and
the light guide plate is configured to be separated from the light source module by a gap having a length corresponding to the distance.

20. The display apparatus according to claim 18, wherein the coupling member further comprises:
a storage portion extending from the first side of the coupling member, the storage portion being configured to support a side surface of the light guide plate, and
a coupling protrusion extending from the second side of the coupling member, the coupling protrusion being configured to couple to the light source module such that the plurality of light sources face the side surface of the light guide plate.

21. The display apparatus according to claim 18, further comprising a support member provided at a corner of the display panel between the top chassis and the bottom chassis, the support member being configured to support a side surface of the display panel.

22. A display apparatus comprising:
a display panel configured to display an image;
a light source module including a plurality of light sources;

a light guide plate configured to guide light generated by the light source module to the display panel, the light guide plate having a tetragonal shape;

a chassis configured to support a rear of the light guide plate; and a coupling member configured to support an edge of the light guide plate, wherein the coupling member comprises:
- an inner surface configured to contact a side of the light guide plate; and
- an outer surface configured to support the light source module, the outer surface being coupled to the chassis, wherein a plane of the outer surface intersects a plane of the inner surface, and wherein light emitted by the plurality of light sources toward the side of the light guide plate is guided through a cut portion provided between the inner surface and the outer surface.

* * * * *